US012392367B2

(12) United States Patent
Capostagno et al.

(10) Patent No.: US 12,392,367 B2
(45) Date of Patent: *Aug. 19, 2025

(54) METHOD FOR LASER MICROWELDING

(71) Applicant: Trumpf Laser UK Limited, Hedge End (GB)

(72) Inventors: Daniel Anthony Capostagno, Santa Clara, CA (US); Jacek Tadeusz Gabzdyl, East Boldre (GB); Malcolm Paul Vamham, Alresford (GB); Paul Martin Harrison, Salisbury (GB); Stephen Roy Norman, Romsey (GB); Adam Piotr Rosowski, Southampton (GB); Tara Murphy, Portsmouth (GB)

(73) Assignee: Trumpf Laser UK Limited, Hedge End (GB)

( * ) Notice: Subject to any disclaimer, the term of this patent is extended or adjusted under 35 U.S.C. 154(b) by 1186 days.

This patent is subject to a terminal disclaimer.

(21) Appl. No.: 15/549,715

(22) PCT Filed: Feb. 8, 2016

(86) PCT No.: PCT/GB2016/000028
§ 371 (c)(1),
(2) Date: Aug. 9, 2017

(87) PCT Pub. No.: WO2016/128704
PCT Pub. Date: Aug. 18, 2016

(65) Prior Publication Data
US 2018/0045232 A1    Feb. 15, 2018

(30) Foreign Application Priority Data

Feb. 9, 2015 (GB) .................................. 1502149
Jun. 1, 2015 (GB) .................................. 1509504
Oct. 7, 2015 (GB) .................................. 1517768

(51) Int. Cl.
*B23K 26/22* (2006.01)
*B23K 26/00* (2014.01)
(Continued)

(52) U.S. Cl.
CPC ............ *F16B 5/08* (2013.01); *B23K 26/0006* (2013.01); *B23K 26/0608* (2013.01);
(Continued)

(58) Field of Classification Search
CPC ............ B23K 26/0006; B23K 26/0608; B23K 26/0622; B23K 26/082; B23K 26/10;
(Continued)

(56) References Cited

U.S. PATENT DOCUMENTS 4,023,005 A * 5/1977 Bolin ..................... B23K 26/18
219/121.64
4,661,677 A * 4/1987 La Rocca ............ B23K 26/244
219/121.14
(Continued)

FOREIGN PATENT DOCUMENTS

CN    105108343 A  * 12/2015
CN    105855706 A    8/2016
(Continued)

OTHER PUBLICATIONS

Machine translation of DE 102012008940A1, worldwide.espacenet.com, created Oct. 21, 2020, 14 pages.*
(Continued)

*Primary Examiner* — Tiffany T Tran
(74) *Attorney, Agent, or Firm* — Iandiorio Teska & Coleman, LLP

(57) ABSTRACT

A weld (3) between a first material (1) and a second material (2), the first material (1) being a first metallic material, and the second material (2) being a second metallic material, the weld (3) has a width (4) between 0.5 mm and 7 mm, the weld
(Continued)

(3) comprises at least one microweld (8), the microweld (8) forms a welding pattern (5) defined parallel to a surface (6) of the first material (1), and the microweld (8) has a characteristic feature size (7) of between 20 μm and 400 um.

24 Claims, 10 Drawing Sheets

(51) Int. Cl.
| | |
|---|---|
| B23K 26/06 | (2014.01) |
| B23K 26/0622 | (2014.01) |
| B23K 26/082 | (2014.01) |
| B23K 26/10 | (2006.01) |
| B23K 26/244 | (2014.01) |
| B23K 26/323 | (2014.01) |
| B23K 26/352 | (2014.01) |
| F16B 5/08 | (2006.01) |

(52) U.S. Cl.
CPC ........ *B23K 26/0622* (2015.10); *B23K 26/082* (2015.10); *B23K 26/10* (2013.01); *B23K 26/22* (2013.01); *B23K 26/244* (2015.10); *B23K 26/323* (2015.10); *B23K 26/355* (2018.08)

(58) Field of Classification Search
CPC .... B23K 26/22; B23K 26/244; B23K 26/323; B23K 26/355; B23K 26/0626; B23K 26/32; B23K 26/0624; B23K 26/21; B23K 26/08; B23K 26/24; G05B 2219/45138; F16B 5/08
See application file for complete search history.

(56) References Cited

U.S. PATENT DOCUMENTS

| | | | | |
|---|---|---|---|---|
| 4,684,781 A * | 8/1987 | Frish | ................ | B23K 35/004 228/115 |
| 4,866,242 A * | 9/1989 | Martyr | ................ | B23K 26/18 219/121.72 |
| 5,268,556 A * | 12/1993 | Coyle, Jr. | ............... | B23K 26/32 219/121.61 |
| 5,502,292 A * | 3/1996 | Pernicka | ................ | B23K 26/24 219/121.63 |
| 6,285,002 B1 | 9/2001 | Ngoi et al. | | |
| 8,314,359 B2 * | 11/2012 | Bovatsek | ................ | B29C 65/14 219/121.64 |
| 2001/0047983 A1* | 12/2001 | Degawa | ............... | B23K 26/244 219/121.64 |
| 2002/0039517 A1* | 4/2002 | Coleman | ................ | B23K 26/24 403/270 |
| 2003/0226247 A1* | 12/2003 | Williamson | ......... | B23K 26/206 29/454 |
| 2004/0151217 A1* | 8/2004 | Yeik | ..................... | B23K 26/034 372/25 |
| 2004/0226923 A1 | 11/2004 | Amorosi et al. | | |
| 2004/0262271 A1 | 12/2004 | Chen | | |
| 2005/0121426 A1* | 6/2005 | Wang | .................. | B23K 26/244 219/121.64 |
| 2006/0000814 A1* | 1/2006 | Gu | ....................... | B23K 26/361 219/121.69 |
| 2006/0150387 A1* | 7/2006 | Kobayashi | ........... | B23K 26/211 29/458 |
| 2006/0237402 A1* | 10/2006 | Nagashima | ........ | B23K 26/0604 219/121.64 |
| 2006/0249487 A1* | 11/2006 | Dunias | ................. | B23K 26/034 219/121.64 |
| 2007/0062919 A1 | 3/2007 | Hamada et al. | | |
| 2007/0158314 A1* | 7/2007 | Fukumitsu | ........... | B28D 5/0052 219/121.6 |
| 2009/0067455 A1* | 3/2009 | Murison | ............... | H01S 3/1003 372/20 |
| 2009/0223940 A1* | 9/2009 | Hosoya | .............. | B23K 15/0093 219/121.64 |
| 2010/0047587 A1* | 2/2010 | Itoh | ........................ | C03B 23/20 428/426 |
| 2011/0042361 A1* | 2/2011 | Nowak | ................... | B23P 6/007 219/121.64 |
| 2012/0094839 A1* | 4/2012 | Khare | ..................... | H01L 39/14 505/210 |
| 2013/0178952 A1* | 7/2013 | Wersborg | ............... | G06N 20/10 700/47 |
| 2014/0054273 A1* | 2/2014 | Behmlander | .......... | B23K 28/02 219/121.64 |
| 2014/0175071 A1* | 6/2014 | Pfitzner | ................ | B23K 26/034 348/90 |
| 2014/0263207 A1* | 9/2014 | Liu | ...................... | B23K 26/323 219/121.61 |
| 2016/0016259 A1* | 1/2016 | Bruck | .................... | B23K 26/26 219/121.64 |
| 2016/0161752 A1* | 6/2016 | Negoita | ................ | H01S 3/1307 359/572 |
| 2017/0239750 A1* | 8/2017 | Yang | ..................... | B23K 26/244 |
| 2018/0281111 A1* | 10/2018 | Kassai | ................ | H01M 50/107 |

FOREIGN PATENT DOCUMENTS

| | | |
|---|---|---|
| CN | 205764438 U | 12/2016 |
| DE | 102012008940 A1 | 11/2013 |
| DE | 102013104548 B3 | 3/2014 |
| EP | 0131487 A1 | 1/1985 |
| EP | 0161037 A2 | 11/1985 |
| EP | 0161037 A3 | 11/1985 |
| EP | 0173655 A1 | 3/1986 |
| EP | 1547719 A2 | 6/2005 |
| JP | 09108874 A * | 4/1997 |
| JP | 2002316282 A * | 10/2002 |
| WO | 2009114375 A2 | 9/2009 |

OTHER PUBLICATIONS

English Translation of JPH09108874A (Year: 1995).*
WO 2013167240 A1 (Year: 2012).*
English Translation of JP2002316282A (Year: 2002).*
English Translation of JP 2010264494 A (Year: 2009).*
JP 2010264494 A (Year: 2009).*
English Translation of JP 2015000414 A (Year: 2013).*
JP 2015000414 A (Year: 2013).*
Ascari et al., "Nanosecond Pulsed Laser Welding of High Carbon Steels", Optics & Laser Technology, 56 (2014), pp. 25-34.

* cited by examiner

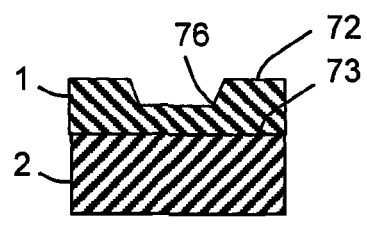
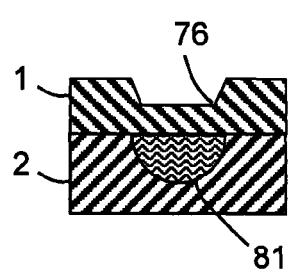
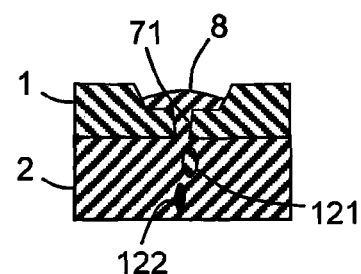
FIG 10    FIG 11    FIG 12
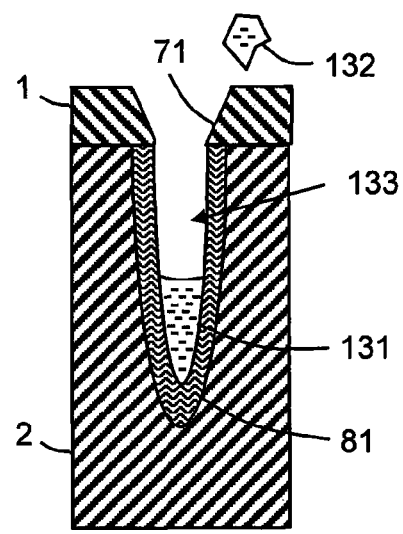
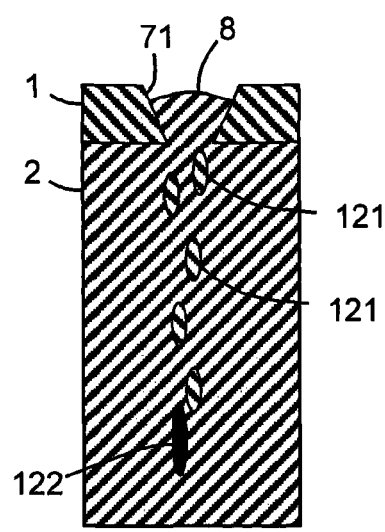
FIG 13    FIG 14

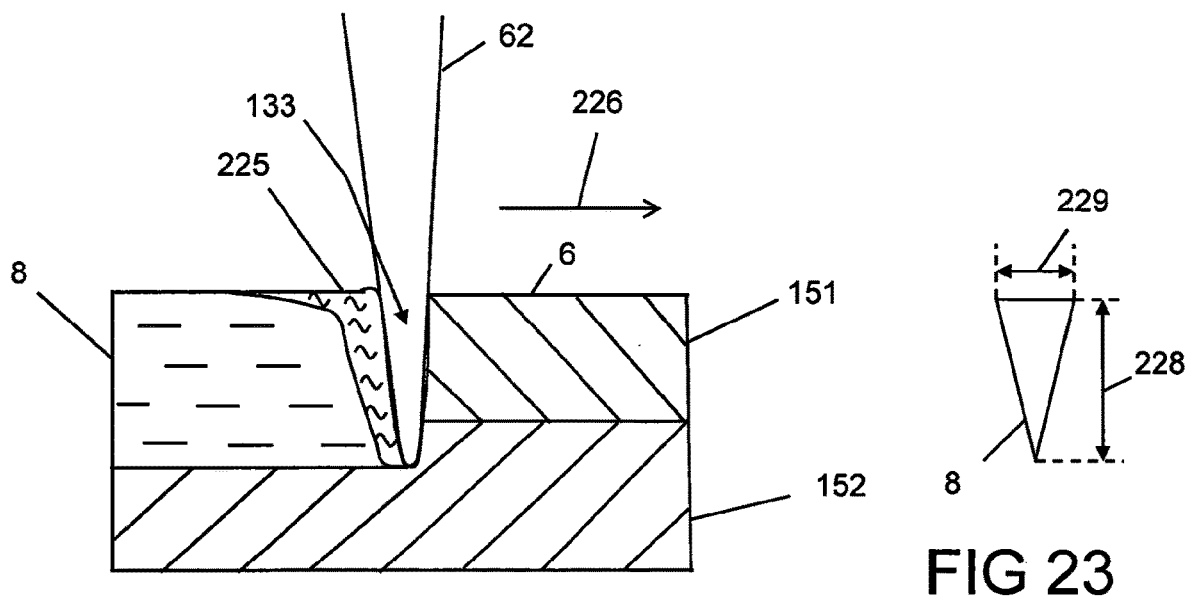
FIG 22
FIG 23
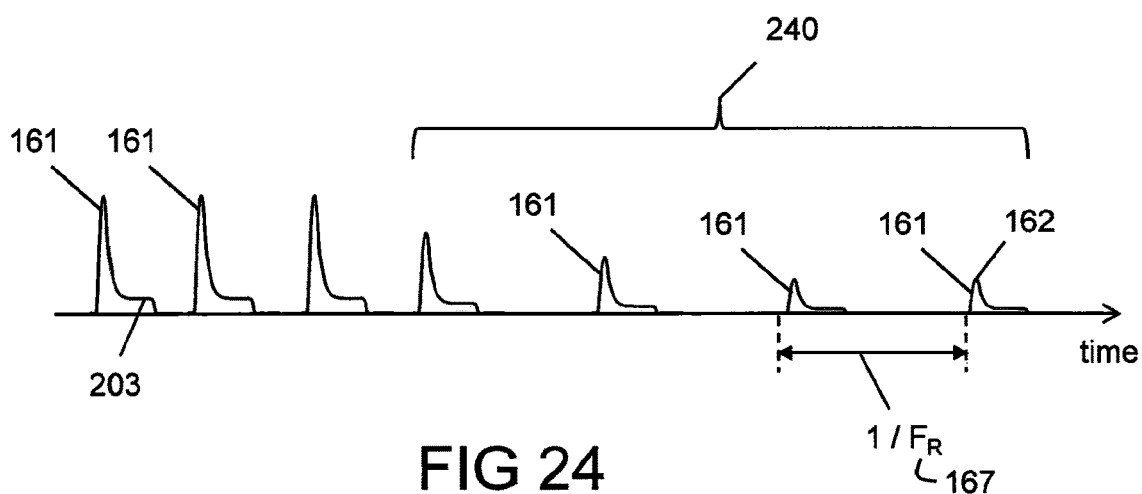
FIG 24
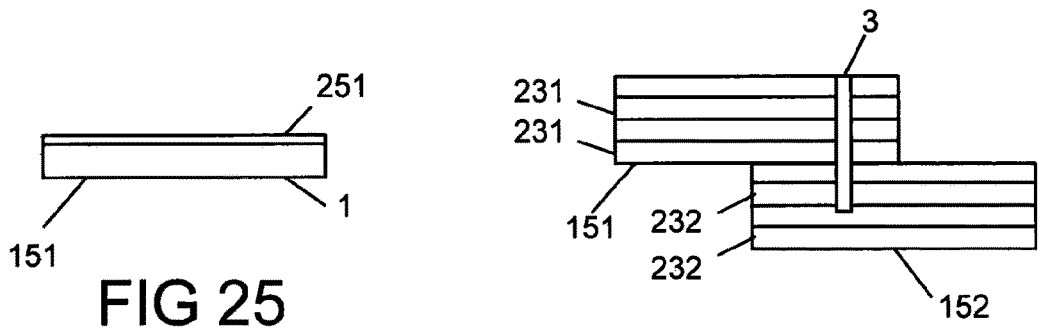
FIG 25
FIG 26

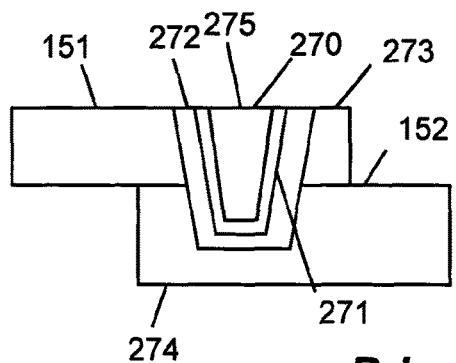
FIG 27 *Prior Art*
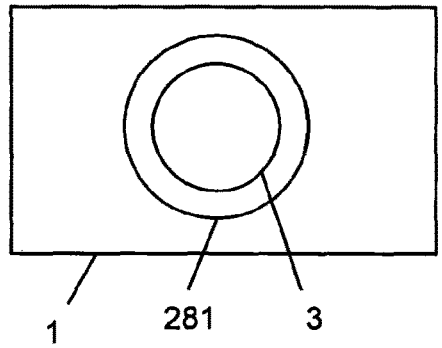
FIG 28
FIG 29
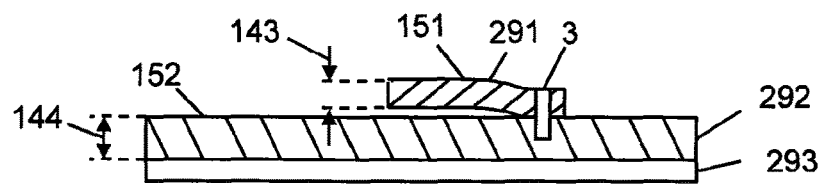
FIG 30
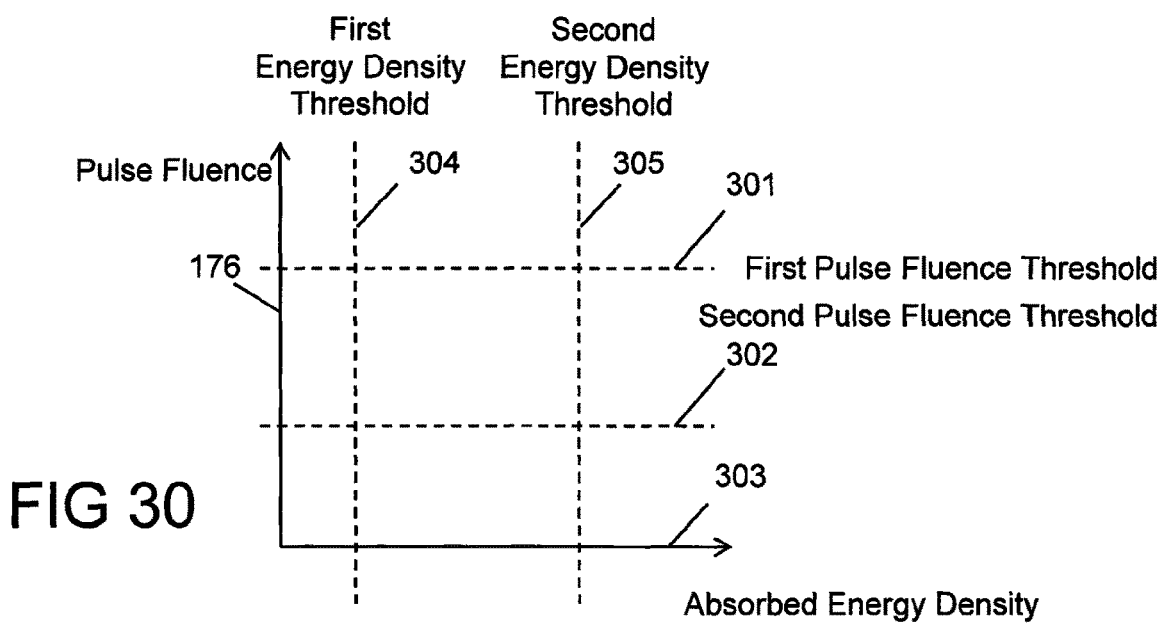

METHOD FOR LASER MICROWELDING

FIELD OF INVENTION

This invention relates to a method for laser microwelding. The weld may join one or more reflective materials. The weld may have a low ohmic resistance, a high shear strength, and a high peel strength.

BACKGROUND TO THE INVENTION

The joining of bright metals such as gold, copper, aluminium, platinum and silver by laser welding in the near infrared spectrum (800 nm to 2500 nm) presents a challenge. This is because the surface of the bright metals is highly reflective with poor absorbance. To overcome the surface reflectivity and initiate coupling of the laser's energy into the metal surface, it is necessary to use laser beams with high power densities.

The function of the laser beam on a bright material approximates a discreet function with a very narrow operating window from beam hold-off (reflection) and absorption. At first the surface reflects substantially all of the laser light. However, once the surface reflectivity is overcome by sufficient laser intensity, a melt of the surface is initiated. The reflectivity then almost immediately transitions from its original highly reflective condition of more than 80% reflectivity to a lower value, which for some metals, can be less than 50% reflectivity. This causes the melt pool on the surface to grow extremely rapidly. It is consequently very difficult to control.

The challenge is increased when welding thin and low mass work pieces. High power densities are often detrimental, leading to over penetration of the laser beam, which results in unreliable joints. Conversely, if lasers are operated at lower power densities that are just above the absorbance limits, then the pulse duration has to be increased. Thermal heat sinking of the absorbed energy into the regions surrounding the weld can then cause overheating of the work piece, resulting in weak or absent welds.

The present known preferred method of laser welding of copper and other bright metals such as gold and silver, involves the use of lasers that emit at visible green wavelengths. The most common lasers are frequency doubled 1064 nm lasers that emit at 532 nm. This is because the reflectivity of bright metals is lower at 532 nm than at near infrared wavelengths. The laser joining of bright metals with such lasers produces welds that are repeatable and consistent but at the cost of efficiency, complexity, and costs associated with frequency doubling. In some applications, it is necessary to combine a laser emitting at 532 nm with a second laser at 1064 nm in order to increase efficiency and productivity. Such dual wavelength systems require closed loop monitoring of the laser welding process using sophisticated beam monitoring and real time analysis in order to analyze and tailor the structure of the weld. Such diagnostic devices use video analysis of the back reflected light and the weld pool characteristics in order to provide feedback to a laser controller. These systems are complex and expensive.

The use of green lasers has been adopted to perform weld joints of bright metals without specifically addressing the application of joining dissimilar metals. Conventional welding of dissimilar metals relies on specific control of the dilution of the metals at the interface and resulting thermal conditions to minimize mixing of the dissimilar metals which results in so-called intermetallics in the joint. Large intermetallic regions are prone to fracture from stresses acting on the joint, and the fracture propagates through the entire joint until failure.

Laser welding with continuous wave and pulsed lasers is well known, with either a continuous weld front, or overlapping spot welds wherein the weld forms a continuous seam. Defects in the materials caused by the welding process create weaknesses, and are unacceptable in the majority of applications. Pulsed welds are typically formed using microsecond and millisecond pulses. The pulse causes the material to melt which resolidifies to form the weld. When welding dissimilar materials, the weld interface can contain intermetallics, which are a compound formed from the two materials being joined, and are typically brittle and undesirable in nature. The weld can therefore preferentially fracture along this intermetallic layer under mechanical load.

Forming low ohmic resistance welds between highly reflective materials has important applications in the electronics and electrical engineering industries, including in the manufacture of batteries, solar cells, semiconductor packaging, and electronic printed circuit boards. Various techniques are used, including laser welding. However the high reflectivity can require relatively expensive visible lasers. In addition, the welding equipment, process and the resulting welds do not meet current requirements of fast manufacturing speeds, low ohmic resistance, high shear strength, and high peel strength. Consequently, processes other than laser welding are often used.

Laser welds in work pieces comprising one or more reflective metals, for example gold, copper, aluminium, platinum and silver, are often unreliable and weak. Laser welds in articles comprising dissimilar materials are typically brittle and undesirable in nature.

There is a need for a method for laser microwelding bright and/or dissimilar metals and alloys that does not have reliability issues and it is an aim of the present invention to provide such a weld method.

THE INVENTION

A weld made according to a method of the present Invention is between a first material and a second material, the first material being a first metallic material, and the second material being a second metallic material, and wherein the weld has a width between 0.5 mm and 7 mm, the weld comprises at least one microweld, the microweld forms a welding pattern defined parallel to a surface of the first material, and the microweld has a characteristic feature size of between 20 µm and 100 um, The weld made according to a method of the present invention has important applications in the electronics and electrical engineering industries. The ability to create welds in reflective metals using nanosecond fibre lasers, emitting in the 1 µm wavelength window, and with pulse energies of around 1 mJ, is new and unexpected. Moreover, the welds can have greater strength and reliability than prior art welds. The weld may be used in articles such for example as batteries, solar cells, semiconductor packaging, and electronic printed circuit boards.

The weld comprises at least one microweld. The microweld forms the welding pattern. The welding pattern may be formed of a plurality of the microwelds. Alternatively, the welding pattern may be formed from a single microweld. The welding pattern may comprise a line in the form of a spiral. Alternatively or additionally, the welding pattern may comprise a plurality of hatch lines. The hatch lines may be in the form of a grid. The hatch lines may form a rectangular grid. The hatch lines may form a triangular grid. The welding pattern is preferably a two dimensional welding pattern.

The first material and the second material may remain substantially unmixed in the weld. By "substantially unmixed" it is meant that the intermetallic content formed by the first material and the second material combined together in single co-mixed alloy phases comprises at most twenty percent, and preferably at most ten percent of the material of the weld. The intermetallic content at interfaces between the first material and the second material may be sufficient to achieve a joint with pre-determined mechanical properties and ohmic resistivity. The intermetallic content at interfaces between the first material and the second material may be small enough to avoid embrittlement such as caused by recrystallization.

The weld may be substantially inhomogeneous. The weld may comprise discrete zones of the first metallic material and the second metallic material.

The first material may have a reflectivity greater than 90% at an optical wavelength of one micron.

The first material may have a different melting temperature than the second material.

The microweld may comprise a hole formed in the first material. The first material may be contained within the second material. At least one of the first and the second material may have flowed into the hole. The first material may have a top surface and a bottom surface. The bottom surface may be closer to the second material than the top surface. The hole may have a width at the top surface and a width at the bottom surface, wherein the width at the top surface is wider than the width at the bottom surface. The hole may be a countersunk hole, and the microweld may resemble a rivet.

The microweld may comprise a zone of the first material within the second material.

Surprisingly, the weld provides a simpler solution for joining bright and dissimilar metals and alloys, producing consistent and predictive results on each joint formed by the weld. Arranging for one of the first and the second materials to flow into the hole without substantially mixing with the other material, helps prevent intermetallics from forming, and avoids the reliability issues associated with intermetallics such as brittleness and weak welds. Consistent and predictive results are obtainable with a range of alloys, including amorphous metal alloys, castings, sintered alloys, and injection formed alloys. They are also obtainable with refractory metals, including iridium, tungsten, molybdenum, niobium, and tantalum. Refractory metals are chemically inert, have a higher density and higher hardness than metals such as iron, copper, and nickel, and are characterised by melting temperatures above 2000° C. The increased surface area of the weld provides more contact area, which in turn reduces ohmic resistance. Reducing ohmic resistance is an important consideration for increasing efficiencies of batteries and solar panels. Examples of parts that may be connected include: electrical connections, such as copper to aluminium connections, inside batteries; low profile electrical connections between flexible circuit elements and thin-section busbars; metallic enclosures for medical electronic devices; electromagnetic interference and radio frequency shielding of electrical components; attaching leads, filaments, and wires to electrical connections and circuit boards; other electrical connections in consumer electronics such as mobile phones, laptop computers, televisions, and other consumer electronic devices; metallic labels and tags; silver, platinum, and gold parts in jewellery; and medical devices, sensors and other electrical circuits. Amorphous metal alloys are used in additive manufacturing, a form of three dimensional printing, wherein metal powders are sintered with a laser.

The first material may comprise a metal selected from the group consisting of copper, aluminium, iron, nickel, tin, titanium, iridium, tungsten, molybdenum, niobium, tantalum, rhenium, silver, platinum, gold, and an alloy comprising at least one of the foregoing materials.

The second material may comprise a metal selected from the group consisting of copper, aluminium, iron, nickel, tin, titanium, iridium, tungsten, molybdenum, niobium, tantalum, rhenium, silver, platinum, gold, and an alloy comprising at least one of the foregoing materials.

Other metals for the first material and the second material may be employed. The first material and the second material may be the same or different.

The width may be between 0.5 mm and 2.5 mm.

The characteristic feature size may be a width of the microweld. The characteristic feature size may be between 40 μm and 100 um.

Examples of articles that may include a weld made using a method of the invention include a smart phone, a mobile phone, a laptop computer, a tablet computer, a television, a consumer electronic device; a battery; a solar cell; an integrated electronic circuit component; a printed circuit board; an electrical connection; a low profile electrical connection between flexible circuit elements and thin-section busbars; a metallic enclosure for a medical electronic device; and an electrical connection in consumer electronics devices; metallic labels and tags; silver, platinum, and gold parts in jewellery.

The present invention provides a method for laser microwelding a first material to a second material, which method comprises:

placing a first metal part comprising the first material on a second metal part comprising the second material;

providing a laser for emitting a laser beam in the form of laser pulses;

providing a scanner for scanning the laser beam with respect to a surface of the first metal part;

providing an objective lens for focusing the laser pulses onto the surface; and providing a controller that is adapted to control the scanner such that the scanner moves the laser beam with respect to the surface, characterized by moving the laser beam with respect to the surface;

focusing the laser pulses with a spot size and a pulse fluence that cause the formation of a weld comprising at least one microweld in the form of a welding pattern defined parallel to the surface;

wherein the microweld has a characteristic feature size of between 20 μm and 400 μm;

the laser pulses have pulse widths between 1 ns and 3000 ns;

the first material is a first metal;

the second material is a second metal which is different from the first metal;

the weld is autogenous, and wherein the controller is operated to select a first laser signal to create a melt pool on the surface, a second laser signal to initiate welding of the first metal part to the second metal part, and a third laser signal to weld the first metal part to the second metal part to form the microweld;

the first laser signal and the second laser signal comprise the laser pulses; and the third laser signal comprises either the laser pulses or a continuous wave laser beam.

The moving of the laser beam with respect to the metal surface may be such that the weld has a width between 0.5 mm and 7 mm.

The laser may be operated to form a plurality of melt pools in the first metal part and a plurality of heat stakes in the second metal part. Each heat stake may extend from a different one of the melt pools and may have a distal end. The method may include adapting the controller to space the focused spots apart by a distance that is small enough to cause the melt pools to overlap and that is large enough to ensure the distal end of the heat stakes are distinct and separate from each other in at least one direction.

The controller may be operated to select a first laser signal to create a melt pool on the surface, a second laser signal to initiate welding of the first metal part to the second metal part, and a third laser signal to weld the first metal part to the second metal part to form the microweld. The first and the second laser signals may be same or different from each other. The first, second, and third laser signals may be provided in a single pass of the laser beam across the surface, or in a plurality of passes of the laser beam across the surface. The first and the second laser signals may be provided in a first pass of the laser beam across the surface, and the third laser signal may be provided in a second pass of the laser beam across the surface.

The second laser signal may be selected to have a plurality of pulses characterized by a pulse width that is greater than 100 ps.

The second laser signal may be selected to have a peak power which is substantially greater than a peak power of the third laser signal.

At least one of the first, second and third signals may be selected to inhibit the formation of intermetallics.

At least one of the first, second and the third signals may be selected to improve the smoothness of a surface of the laser weld.

The welding process may be one that forms a key hole. The method may include providing a fourth laser signal which is selected to close the key hole.

The first material may be substantially more ductile than the second material.

The laser may be characterized by a beam quality $M^2$ less than 4, preferably less than 2, and more preferably less than 1.3.

The laser may be a nanosecond laser.

The laser may be characterized by a wavelength between 1000 nm and 3000 nm.

The laser may be a rare-earth doped fibre laser.

The method may comprise forming a hole in the first material with the laser, melting at least one of the first and the second material with the laser, and flowing at least one of the first and the second material into the hole.

The first material and the second material may remain substantially unmixed in the weld.

The hole may be formed by pulsing the laser such that at least some of the first material is injected into the second material.

The hole may be formed by first forming a hole that does not penetrate through the first material, and then pulsing the laser such that at least some of the first material is injected into the second material.

The first material may have a top surface and a bottom surface. The bottom surface may be closer to the second material than the top surface. The hole may have a width at the top surface and a width at the bottom surface, wherein the width at the top surface is wider than the width at the bottom surface. The hole may be a countersunk hole.

The method may include a step of remelting at least one of the first material and the second material with the laser.

The weld may comprise at least one void in at least one of the first material and the second material.

The pulse repetition rate may be greater than 10 kHz, may be greater than 100 kHz, and may be greater than 200 kHz. The spot size, the pulse fluence, the pulse width, and the pulse repetition frequency may be selected such that at least one of the first material and the second material resolidifies between successive laser pulses thereby inhibiting the formation of an intermetallic phase in the weld. Selecting a pulse waveform that ensures that at least one of the first material and the second material is quenched rapidly substantially reduces intermetallic growth, and thereby avoids the reliability issues associated with intermetallics such as brittleness and weak welds.

The spot size may be less than 100 µm. The spot size may be less than 60 µm.

The first material may have a higher melting temperature than the second material.

The first material may have a reflectivity greater than 90% at an optical wavelength of one micron.

BRIEF DESCRIPTION OF THE DRAWINGS

Embodiments of the invention will now be described solely by way of example and with reference to the accompanying drawings wherein:

FIG. 10 shows a hole that does not pass through the first material;
FIG. 11 shows molten second material underneath the hole;
FIG. 12 shows the finished weld wherein molten second material has flowed into the hole formed in the first material by the laser;
FIG. 13 shows a weld being formed;
FIG. 14 shows a weld having zones of the first material within the second material;
FIG. 22 shows a microweld being made using keyhole welding;
FIG. 23 shows a cross section of a microweld;
FIG. 24 shows a waveform that is used to close a keyhole;

FIG. 25 shows a first material that is coated with a coating;

FIG. 26 shows a first material welded to a second material, wherein the first and the second material comprise layers;

FIG. 27 shows a prior art weld comprising intermetallics and a heat affected zone;

FIG. 28 shows a weld according to the present invention comprising a heat affected zone;

FIG. 29 shows a tab welded to a second metal part with a weld;

FIG. 30 shows a graph of pulse fluence and absorbed energy density;

DETAILED DESCRIPTION OF PREFERRED EMBODIMENTS OF THE INVENTION

Figure 1:
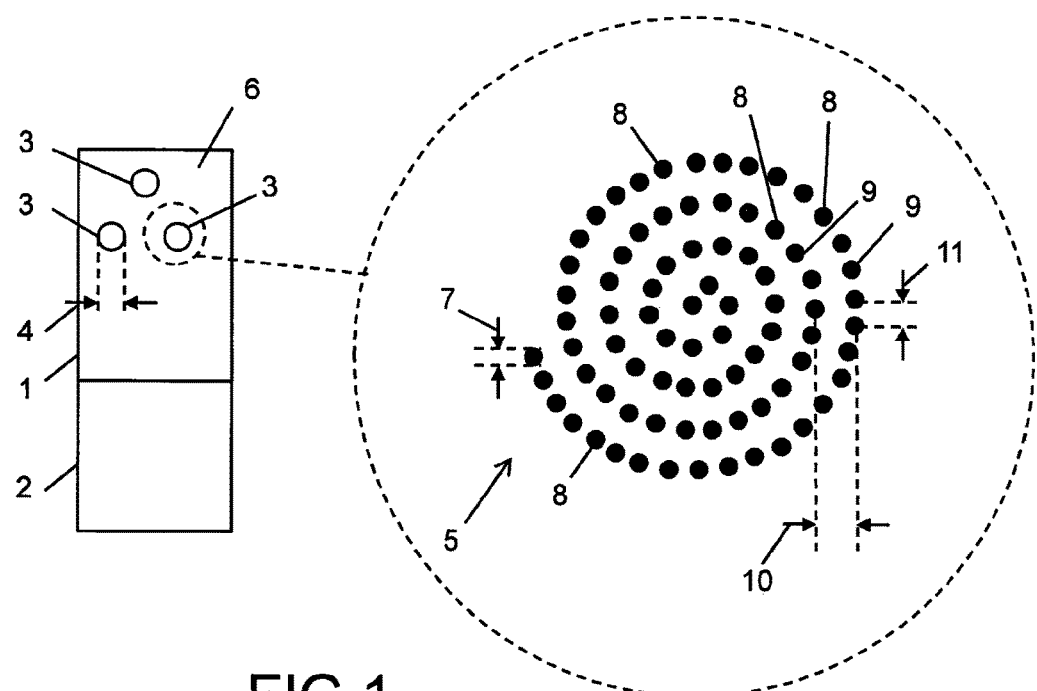
FIG. 1 shows a weld according to the present invention.

A weld according to the invention will now be described solely by way of example and with reference to FIG. 1. FIG. 1 shows a weld 3 between a first material 1 and a second material 2, the first material 1 being a first metallic material, and the second material 2 being a second metallic material, the weld 3 has a width 4 between 0.5 mm and 7 mm, the weld comprises at least one microweld 8, the microweld 8 forms a welding pattern 5 (shown enlarged) defined parallel to a surface 6 of the first material 1, and the microweld 8 has a characteristic feature size 7 of between 20 μm and 400 um.

By parallel to the surface 6 of the first material 1, it is meant either on the surface 6 in the vicinity of the weld 3, or beneath the surface 6, for example, below a weld pool. The welding pattern 5 is preferably a two dimensional welding pattern. By width 4 of the weld 3, it is meant the smallest transverse dimension of the weld 3 on the surface 6.

The welding pattern 5 shown in FIG. 1 comprises a plurality of microwelds 8 in the form of a spiral. The characteristic feature size 7 of the microwelds 8 is the width or the diameter of the microwelds 8. The arms 9 of the spiral are separated by a first separation 10. The microwelds 8 are separated by a second separation 11 within the arms 9 of the spiral. The second separation 11 can be 50 μm to 450 μm. Preferably, the second separation 11 is between 50 μm and 200 μm. The spiral may be circular, or may be elongated such as in the form of a race track. Other patterns may also be used.

Figure 2:
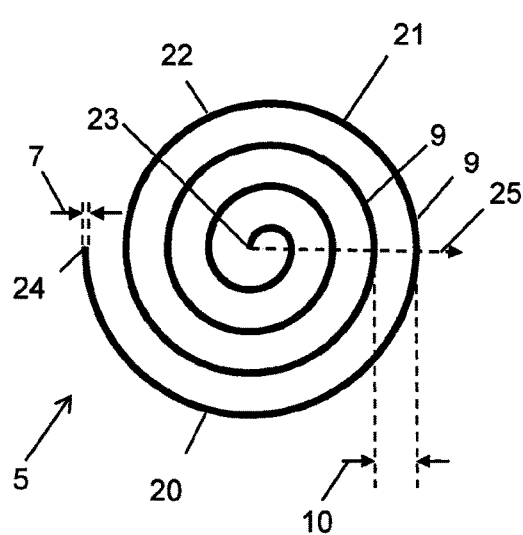
FIG. 2 shows a weld in the form of a continuous spiral.

The weld 3 can be in the form of the welding pattern 20 shown in FIG. 2, which welding pattern 20 comprises a single microweld 21 that is in the form of a spiral 22. The characteristic features size 7 of the microweld 21 is the width of the microweld 8. The arms 9 of the spiral are separated by the first separation 10.

Figure 3:
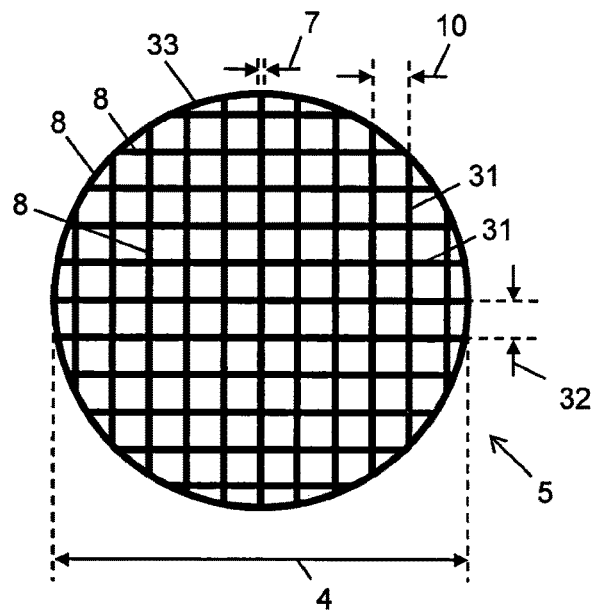
FIG. 3 shows a weld in the form of rectangular hatching.
Figure 4:
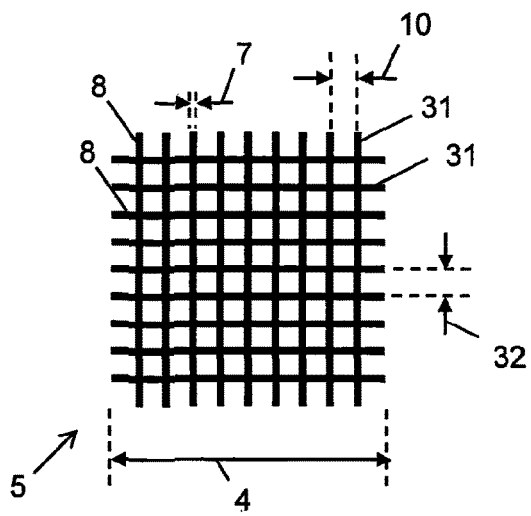
FIG. 4 shows a weld in the form of rectangular hatching.
Figure 5:
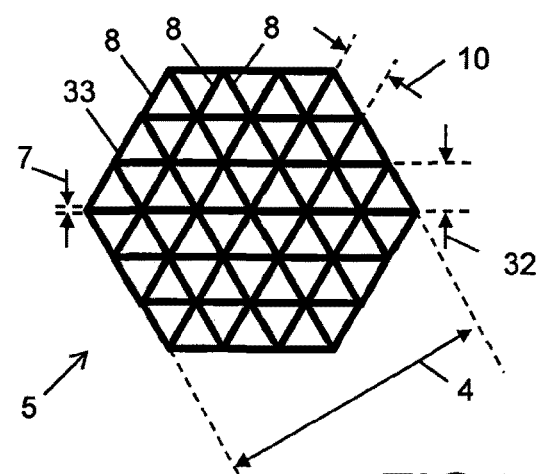
FIG. 5 shows a weld in the form of triangular hatching.

The welding pattern 5 may comprise a plurality of hatch lines 31 as shown in FIGS. 3, 4 and 5, each hatch line 31 comprising at least one microweld 8. The welding pattern 5 may comprise a perimeter ring 33 comprising at least one microweld 8 as shown in FIGS. 3 and 5. Advantageously, the perimeter ring 33 can help to relieve stress in the weld 3. The characteristic feature size 7 of the microweld 8 is the width of the microweld 8. The hatch lines 31 may comprise a rectangular grid, as shown in FIGS. 3 and 4, with individual hatch lines 31 being separated by the first separation 10 and by a third separation 32. The hatch lines 31 may also form a triangular grid as shown with reference to FIG. 5. Other grid patterns are also possible.

The first separation 10 in FIGS. 1 to 5 can be in the range 20 to 2000 μm. The first separation 10 can be in the range 50 μm to 500 μm. Preferably the first separation 10 is the range 50 μm to 250 μm. More preferably the first separation 10 is in the range 50 μm to 125 μm.

The third separation 32 in FIGS. 3 to 5 can be in the range 20 to 2000 μm. The third separation 32 can be in the range 50 μm to 500 μm. Preferably the third separation 32 is the range 50 μm to 250 μm. More preferably the third separation 32 is in the range 50 μm to 125 μm. The third separation 32 can be the same as the first separation 10.

Figure 6:
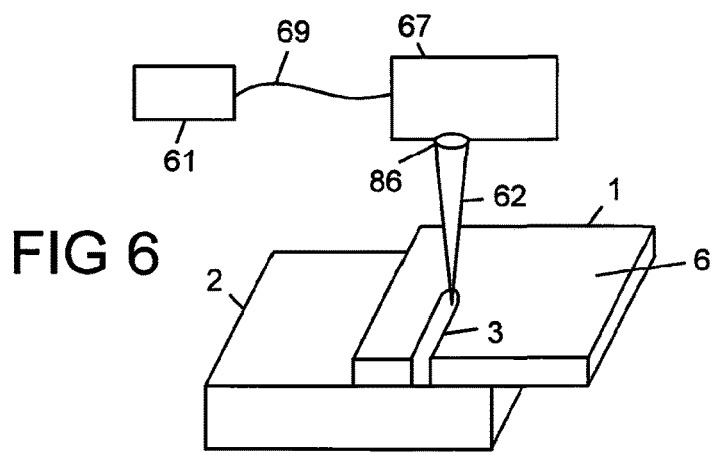
FIG. 6 shows a laser system for producing a weld according to the present invention.

The weld 3 can be made using the apparatus shown in FIG. 6. The apparatus comprises a laser 61 coupled to a laser scanner 67 by beam delivery cable 69. The laser 61 emits a laser beam 62 which is focused onto the surface 6 with an objective lens 68.

The laser 61 is preferably a nanosecond laser that emits at a wavelength of approximately 1060 nm. Various options for the laser 61 will be described later.

By a nanosecond pulsed laser, it is meant a laser that can emit pulses having pulse widths in the range 1 ns to 1000 ns. Such lasers may also be able to emit shorter pulses, and longer pulses, and may also be able to emit continuous wave radiation. Such lasers are different from prior art millisecond lasers that are conventionally used for producing welds. Millisecond lasers generally form a weld by emitting a single pulse, and the welds that are formed by millisecond lasers have a very different visual appearance from the welds 3 of the present invention. Surprisingly, the welds 3 of the present invention can be formed in highly reflective metals and refractory metals, and by virtue of the shorter pulses that contain less energy, the welds 3 are extremely strong, even when using dissimilar metals, highly-reflective metals. At least one of the first material 1 and the second material 2 may cool down very rapidly between pulses, leaving insufficient time for intermetallic formation within the microweld 8. Welds 3 can also be formed in combinations of metals, such as aluminium and stainless steel, in which strong, reliable and predictive welds have been difficult to achieve with prior art techniques.

Figure 7:
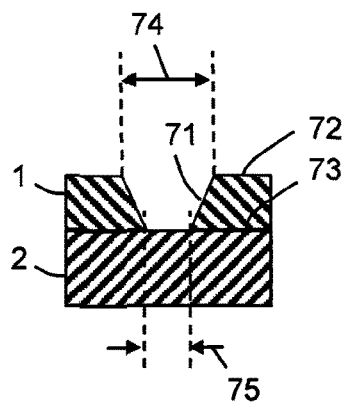
FIG. 7 shows a hole cut in the first material by the laser.
Figure 8:
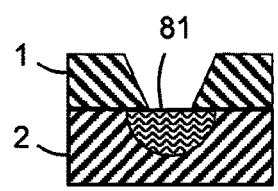
FIG. 8 shows second material that has been melted by the laser.
Figure 9:
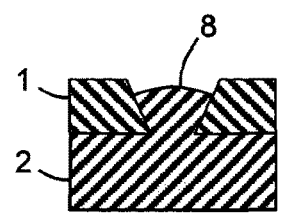
FIG. 9 shows the finished weld wherein the molten second material has flowed into the hole formed in the first material by the laser.

As shown in FIGS. 7 to 9, the first material 1 and the second material 2 may be substantially unmixed in the microweld 8. FIG. 7 shows a hole 71 that has been formed with the laser 61. FIG. 8 shows molten second material 81 that has been melted with a laser. FIG. 8 shows the microweld 8 that is formed after the molten second material 81 has flowed into the hole 71 and resolidified. The flow may occur because of capillary action, by vapour pressure caused by the rapid expansion of vapourized material by the laser pulse, or by the Marangoni effect, which is the mass transfer along an interface between two fluids due to surface tension gradient. In the case of temperature dependence, this phenomenon may be called thermo-capillary convection (or Bénard-Marangoni convection).

The weld 3 shown with reference to FIGS. 7 to 9 has a top surface 72 and a bottom surface 73. The hole 71 has a width 74 at the top surface 72 which is wider than a width 75 at the bottom surface 73. Importantly, such an arrangement can increase the peel strength of the microweld 8. The hole 71 is a countersunk hole and the microweld 8 resembles a rivet. The width 74 may be less than 200 µm. The width 74 may be less than 50 µm. The width 74 may be less than 20 µm.

FIG. 10 shows a hole 76 that does not penetrate through the first material 1. The hole 76 can be formed by ensuring that the energy in the pulse is not sufficient to raise the vapour pressure in the first material 1 to a level in which the hole 76 penetrates to the bottom surface 73 of the first material 1. This can be achieved by selecting the laser 61 such that it can deliver lower energy pulses such as pulses with lower peak powers, or pulse widths that are less than 20 ns. The scanner 67 can be used to scan the laser beam 62 on the first material 1 in order to obtain a predetermined shape of the hole 71. For high reflectivity materials (for example, reflectivity greater than around 90% at 1 µm wavelength) picoseconds lasers (lasers that emit pulses having pulse widths between 1 ps and 1000 ps) may be used advantageously. FIG. 11 shows molten second material 81 that has been melted by the laser 61. The laser 61 can then be pulsed such that the hole 76 now penetrates to the second surface 73, creating the hole 71, thus allowing at least some of the second material 2 to flow into the hole 71 as shown with reference to FIG. 12. At least some of the first material 1 may be injected into the second material 2, as shown by the zones 121 of the resulting microweld 8 shown in FIG. 12. At least one void 122 may also occur in the second material 2. The void 122 may assist the flow of the second material 2 through the hole 71 by vapour pressure.

FIGS. 13 and 14 shown a microweld 8 formed with a laser 61 that has sufficient peak power to overcome the reflectivity of the first material 1, and sufficient energy to form a key hole 133 in the second material 2. Vapour pressure caused by the rapid heating of the first material 1 causes at least some of the first material 1 to be injected into the hole 71 or ejected from the hole 71. This is shown by the material 131 being injected into the key hole 133 formed in the second material 2, and the material 132 being emitted out of the hole 71. The materials 131 and 132 may be in the vapour phase, fluid phase, solid phase, or a combination of at least two of the forgoing material phases. Molten second material 81 can then flow into the hole 71 as shown with reference to FIG. 14. Zones 121 of the first material 1 and voids 122 may be present in the microweld 8.

The microwelds 8 shown with reference to FIGS. 1 to 5 can be one or more of the microwelds 8 shown with reference to FIGS. 9, 12 and 14.

The microweld 8 may be substantially inhomogeneous. Unlike prior art welds, the microweld 8 may be substantially unmixed. By "substantially unmixed" it is meant that the intermetallic content formed by the first material 1 and the second material 2 combined together in single co-mixed alloy phases comprises at most twenty percent, and preferably at most ten percent of the material of the microweld 8. The intermetallic content at interfaces between the first material 1 and the second material 2 may be sufficient to achieve a joint with pre-determined mechanical properties and ohmic resistivity. The intermetallic content at interfaces between the first material 1 and the second material 2 may be small enough to avoid embrittlement such as caused by recrystallization. Advantageously this avoids the problems of brittle or weak welds arising from intermetallics that can occur when forming a weld between dissimilar metals. The result is a weld 3 capable of joining bright and dissimilar metals and alloys, producing consistent and predictive results on each weld.

The first material 1 may have a different melting temperature than the second material 2. This enables one of the first and the second materials 1, 2 to resolidify prior to the other material, and to flow, thus avoiding substantial mixing of the first and the second materials 1, 2. In order to optimize the performance of the microweld 8, the parameters of the laser 61, such as pulse width, pulse repetition frequency, pulse energy, and peak power can be adjusted. The first material 1 may have a melting temperature that is at least 50% higher or lower than a melting temperature of the second material 2.

The first material 1 may be defined by a Young's modulus which is less than a Young's modulus of the second material 2. Advantageously, the first material 1 may be substantially more ductile than the second material 2. This has advantages if the weld 3 is repeatedly strained since the microwelds 8 will be more resistant to metal fatigue.

The first material 1 may have a reflectivity 145 greater than 90% at an optical wavelength 140 of one micron. The reflectivity 145 can be defined at 20 C.

With reference to FIGS. 1 to 5 and 7 to 14, the first material 1 can comprise a metal selected from the group consisting of copper, aluminium, iron, nickel, tin, titanium, iridium, tungsten, molybdenum, niobium, tantalum, rhenium, silver, platinum, gold, and an alloy comprising at least one of the foregoing materials. The alloy can be bronze, brass, a nickel titanium alloy, or an amorphous alloy. The second material 2 can comprise a metal selected from the group consisting of copper, aluminium, iron, nickel, tin, titanium, iridium, tungsten, molybdenum, niobium, tantalum, rhenium, silver, platinum, gold, and an alloy comprising at least one of the foregoing materials. Other metals for the first material 1 and the second material 2 may be employed. The first material 1 and the second material 2 may be the same or different.

Surprisingly, a weld 3 between bright and dissimilar metals and alloys has consistent and predictive qualities. Arranging for one of the first and the second materials 1, 2 to flow into the hole 71 without substantially mixing with the other material, helps prevent intermetallics from forming, and avoids the reliability issues associated with intermetallics such as welds which are brittle and weak. The increased surface area of the weld 3 provides more contact area, which in turn reduces ohmic resistance. Reducing ohmic resistance is an important consideration for increasing efficiencies of batteries and solar panels.

The width 4 may be between 0.5 mm and 2.5 mm. Preferably the characteristic feature size 7 is between 40 µm and 100 µm.

The present invention also provides an article comprising at least one weld 3 according to the Figures disclosed. Examples of articles are smart phones, mobile phones, laptop computers, tablet computers, televisions, and other consumer electronic devices; batteries; solar cells; integrated electronic circuit components; printed circuit boards; electrical connections, such as copper to aluminium connections, inside batteries; low profile electrical connections between flexible circuit elements and thin-section busbars; metallic enclosures for medical electronic devices; and electrical connections in consumer electronics devices; metallic labels and tags; silver, platinum, and gold parts in jewellery.

A method according to the invention for laser welding a first material 1 to a second material 2, will now be described with reference to FIG. 15. The method comprises:

placing a first metal part 151 comprising the first material 1 on a second metal part 152 comprising the second material 2, providing a laser 61 for emitting a laser beam 62 in the form of laser pulses 161, providing a scanner 67 for scanning the laser beam 62 with respect to a surface 6 of the first metal part 151, providing an objective lens 68 for focusing the laser pulses 161 onto the surface 6, and providing a controller 153 that is adapted to control the scanner 67 such that the scanner 67 moves the laser beam 62 with respect to the surface 6, characterized by moving the laser beam 62 with respect to the surface 6, focusing the laser pulses 161 to form a focused spot 12 with a spot size 174 and a pulse fluence 176 (shown with reference to FIG. 17) that cause the formation of at least one microweld 8 in the form of a welding pattern 5 defined parallel to the surface 6;

the moving of the laser beam 62 with respect to the metal surface is such that the weld 3 has a width 4 (shown with reference to FIG. 1) between 0.5 mm and 7 mm.

wherein the microweld 8 has a characteristic feature size 7 of between 20 µm and 400 µm.

The laser radiation 62 is directed to the scanner 67 via an optical fibre 147 and a collimation optic 142.

The laser beam 62 is preferably moved in two dimensions with respect to the surface 6 such that the resulting welding pattern 5 is a two dimensional welding pattern.

Figure 15:
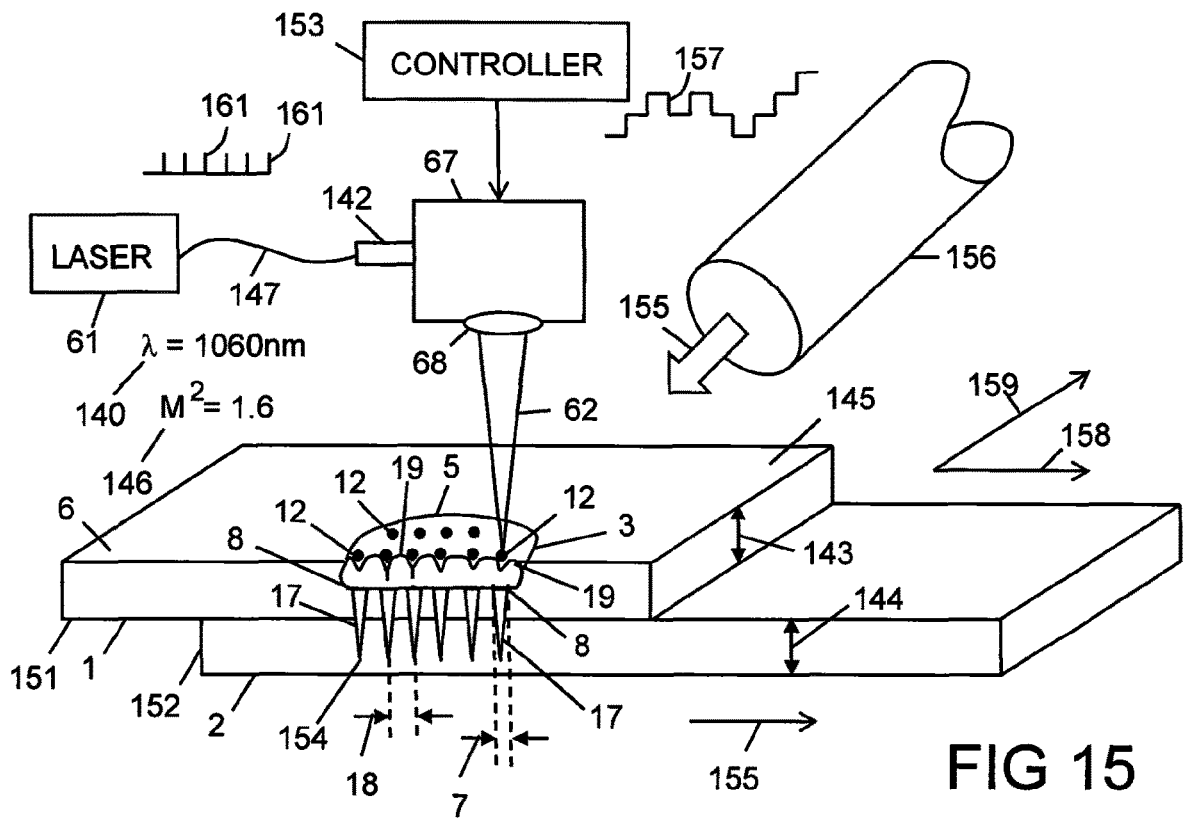
FIG. 15 shows a laser system for producing a weld according to the present invention.

FIG. 15 shows the laser 61 emitting at a wavelength 140 and a beam quality 146 defined by an $M^2$ value. The wavelength is shown as being 1060 nm and the beam quality 146 as being 1.6; this is intended to be non-limiting.

The first metal part 151 can have a thickness 143 in a region of the weld 3 of no more than 5 mm. The thickness 143 may be less than 2 mm. The thickness 143 may be less than 1 mm. The thickness 143 may be less than 0.5 mm. The second metal part 152 can have a thickness 144 in a region of the weld 3 of at least 100 µm. The thickness 144 may be less than 0.5 mm. The first metal part 151 can have a reflectivity 145 greater than 80%. Other reflectivities are also possible.

Figure 16:
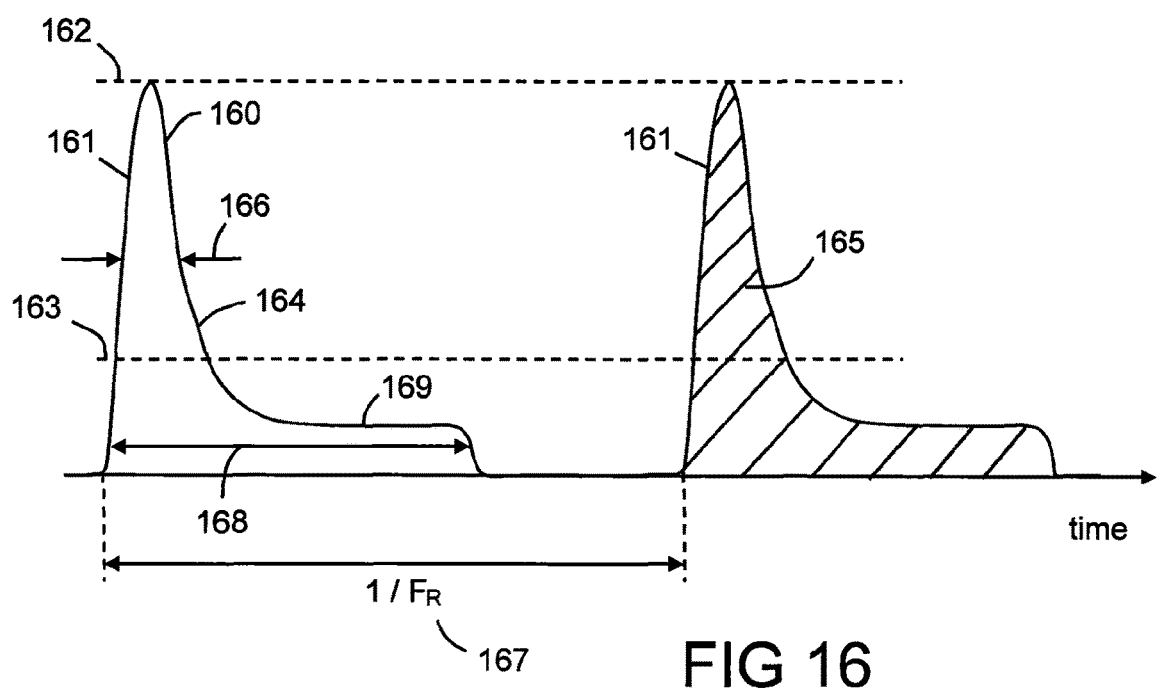
FIG. 16 shows parameters of a pulsed laser waveform.

FIG. 16 shows pulses 161 defined by a peak power 162, an average power 163, a pulse shape 164, pulse energy 165 (shown as the shaded area under the pulse), a pulse width 166, and pulse repetition frequency $F_R$ 167. The average power 163 is equal to the product of the pulse energy 165 and the pulse repetition frequency 167. The pulse width 166 is shown as the full width half maximum value (FWHM) of the peak power 162. Also shown is a pulse width 168 measured at 10% of the peak power 162. The pulse 161 comprises a pre-pulse 160 that can be followed by a lower power region 169.

Figure 17:
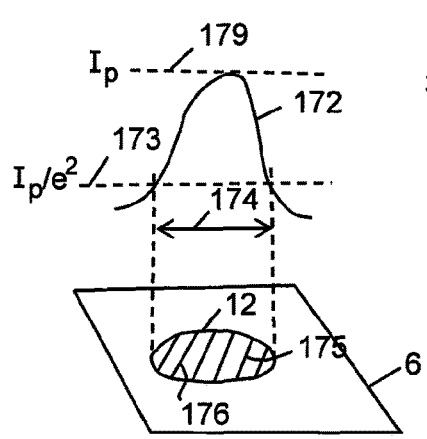
FIG. 17 shows parameters of a focused laser spot.

FIG. 17 shows a spot 12 having a spot size 174 formed by focusing the laser beam 62 onto the surface 6. The optical intensity 172 is the power per unit area of the laser beam 62. The optical intensity 172 varies across the radius of the spot 12 from a peak intensity 179 at its centre, to a $1/e^2$ intensity 173 and to zero. The spot size 174 is typically taken as the $1/e^2$ diameter of the spot 12, which is the diameter at which the optical intensity 172 falls to the $1/e^2$ intensity 173 on either side of the peak intensity 179. The area 175 of the spot 12 is typically taken as the cross-sectional area of the spot 12 within the $1/e^2$ diameter. Pulse fluence 176 is defined as the energy per unit area of the spot 12 on the surface 6. Pulse fluence is typically measured in $J/cm^2$, and is an important parameter for laser welding because weld quality is highly influenced by the pulse fluence 176.

The laser 61, the collimation optic 142 and the objective lens 68, should be selected such that sufficient optical intensity 172 and pulse fluence 176 can be obtained to overcome the reflectivity of the surface 6. The pre-pulse 160 can be used for overcoming the reflectivity of the first material 1, and for forming the hole 71 shown with reference to FIGS. 7 to 14. The lower power region 169 can be used to melt the second material 2. The laser parameters shown with reference to FIG. 16 can be adjusted to optimize desired characteristics of the weld 3. The optimum pulse fluence 176 for a particular weld varies between different materials and material thicknesses. The optimum pulse fluence 176 for welding a metal piece part can be determined through experimentation.

The laser 61 in FIG. 15 can be operated to form a plurality of melt pools 19 in the first metal part 151 and a plurality of heat stakes 17 in the second metal part 152. Each heat stake 17 extends from a different one of the melt pools 19 and has a distal end 154. The method includes adapting the controller 153 such that the laser 61 and the scanner 67 cause the focused spots 12 to be spaced apart by a distance that is small enough to cause the melt pools 19 to overlap and that is large enough to ensure the distal end 154 of the heat stakes 17 are distinct and separate from each other in at least one direction 155.

By "distinct and separate from each other", it is meant that the distal ends 154 of the heat stakes 17 do not form a substantially smooth weld in all directions; the heat stakes 17 may be at least partially separate from each other in at least one direction 155. Alternatively, the heat stakes 17 may be at least partially separate from each other in all directions substantially parallel to the metal surface 6. By "weld" it is meant a connection made by welding or joining.

Figure 18:
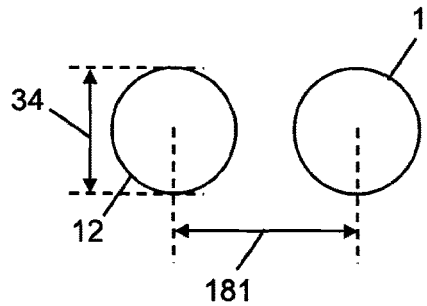
FIG. 18 shows two focused laser spots spaced apart.
Figure 19:
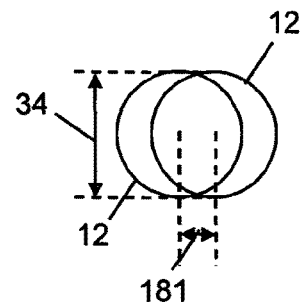
FIG. 19 shows two focused laser spots that are overlapping.
Figure 20:
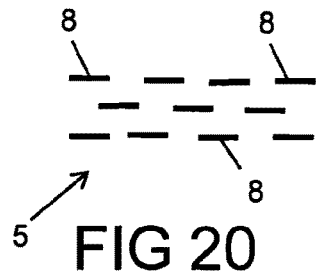
FIG. 20 shows a stitched pattern of microwelds.

Successive focused laser spots 12 may be separated as shown in FIG. 18 such that the separation 181 between the centres of the laser spots 12 is greater than the spot size 34. Alternatively or additionally, successive focused laser spots 12 may overlap as shown in FIG. 18 such that the separation 181 is less than the spot size 34. If the laser spots 12 are separated as shown in FIG. 18, then the heat stakes 17 can be distinct and separate from each other from each other in more than one direction 155. If however the laser spots 12 overlap, as shown in FIG. 19, then the resulting microwelds 8 can be linear welds such as shown in FIG. 20. The pattern 5 can either be formed from a plurality of such microwelds 8 as shown, or be formed by a pattern 5 of a single microweld 8. In the latter case, the heat stakes 17 are distinct and separate from each other in only one direction 155. In FIGS. 17 and 18, the focused laser spot 12 may represent a single laser pulse 161 or multiple laser pulses 161, and the above discussion extends to the case in which the laser spot 12 is dithered to increase the characteristic feature size 7 of the microweld 8.

Each heat stake 17 is formed by at least one of the pulses 161, the number of pulses 161 being dependent on the pulse fluence 176. Ten to one hundred pulses 161 are typically used for a laser with 1 mJ pulse energy 165. The distance 181 between the centres of the focused spots 12 will approximate the distance 18 between the centres of the respective heat stakes 17. The controller 153 can cause the scanner 67 to hold the focused spot 12 still during the formation of each of the heat stakes 17. Alternatively, the controller 153 can cause the scanner 67 to dither the focused spot 12 during the formation of each of the heat stakes 17, preferably by an amount less than the distance 18. The distance 18 is typically 20 μm to 150 μm, and preferably 40 μm to 100 μm.

The weld 3 can be a composite weld formed by the overlapping melt pools 19 and the heat stakes 17. For clarity, FIG. 15 shows the focused spots 12 as black circles, and the weld 3 in cross section within a three dimensional depiction. The melt pools 19 are shown melted together without boundaries between them, and an interface is shown between the melt pools 19 and the heat stakes 17. Metallurgical studies have demonstrated that both the melt pools 19 and the heat stakes 17 may comprise material that is from both the first material 1 and the second material 2.

Good mixing of the metals can be achieved, which can be advantageous when both the first and the second materials 1, 2 are stainless steel. In this case there is generally no well defined boundary between the melt pools 19 and the heat stakes 17.

The distal ends 154 of the heat stakes 17 are shown as ending in a sharp point. However this is not necessarily so; the distal ends 154 may be substantially curved and may be fragmented such that they have more than one end.

As shown with reference to FIG. 15, the method may include the step of providing a shield gas 155 from a gas supply 156, and applying the shield gas 155 over the weld 3. Shield gases can be used to keep to prevent the weld 3 oxidising or to keep the weld 3 clean. The shield gas 155 can be argon, helium, nitrogen, or other gases commonly used in laser welding. The shield gas 155 may be mixtures of gases. The gas supply 156 may comprise a gas bottle, a nozzle, and a flow control regulator.

The weld 3 has a substantially jagged surface at the distal ends 154 of the heat stakes 17. This is in direct contrast with conventional welding practice in which a smooth distal end of the weld is thought to be advantageous. A weld line that is not smooth is believed to be a cause for concern in the prior art.

The apparatus is preferably such that the laser pulses 161 are in synchronism with a control signal 157 used to control the scanner 67. This may be achieved by applying a synchronisation signal into the controller 153, or by adapting the controller 153 such that the controller also controls the laser 61.

The scanner 67 can be a galvanometric scan head. Alternatively or additionally, the scanner 67 can be a moveable two-dimensional or three-dimensional translation stage, or a robot arm. The scanner 67 is such that it can move the laser beam 62 in a first direction 158 and a second direction 159. The scanner 67 and the objective lens 68 may be part of a processing optics known by persons skilled in the art. The processing optic may have additional optical elements like tiled mirrors, additional focus control and/or beam shaping optics.

Figure 21:
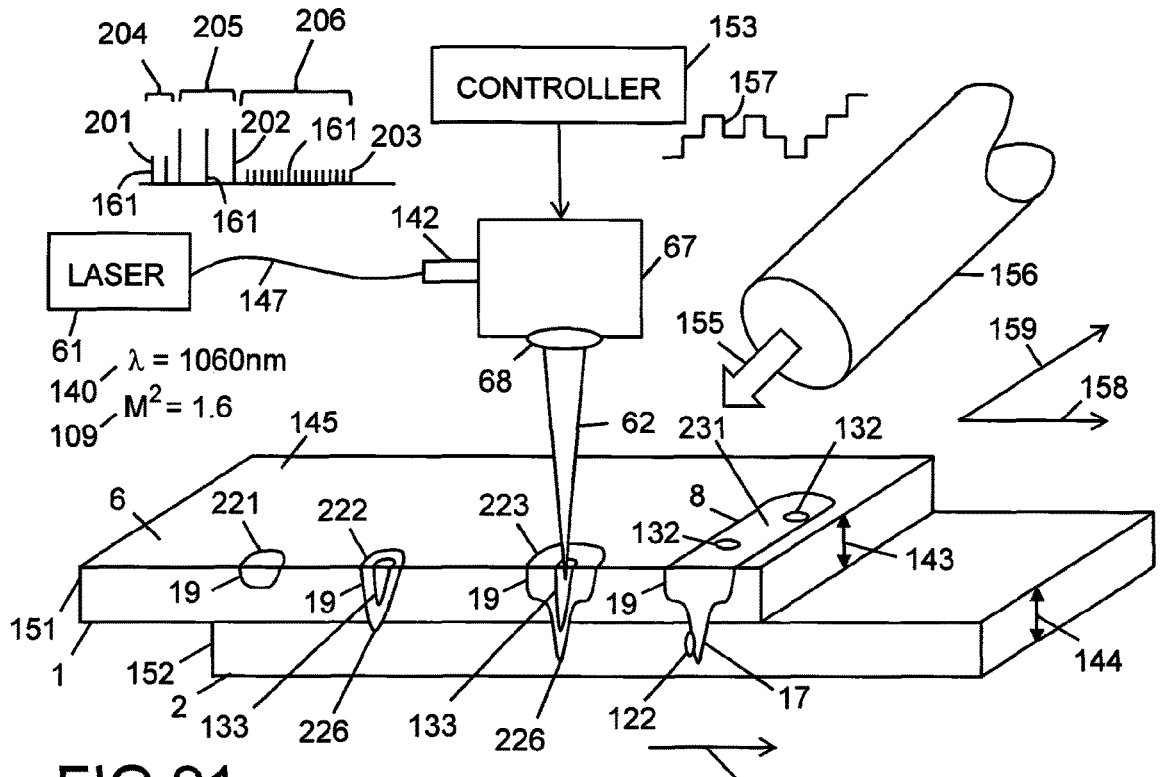
FIG. 21 shows a laser system wherein a pulsed laser output is varied while making the weld.

As shown in FIG. 21, the method of the invention may comprise operating the controller 153 to select a first laser signal 201 to create the melt pool 19 on the metal surface 6, a second laser signal 202 to initiate welding of the first metal part 151 to the second metal part 152, and a third laser signal 203 to weld the first metal part 151 to the second metal part 152 to form the microweld 8. The first, second and third laser signals 201, 202, 203 are depicted comprising the laser pulses 161. Preferably, the controller 153 controls the laser 61 such that the first, second and third laser signals 201, 202, 203 are in synchronism with the scanner 67.

A first cross section 221 shows the melt pool 19 caused by absorption of the first laser signal 201 by the first material 1 during a first time period 204. When welding reflective metals, the absorption of the metal can increase significantly when the melt pool 19 is created. To optimize the weld properties, it can therefore be important for the controller 153 to select the second laser signal 202 once the reflectivity 145 changes.

A second cross section 222 shows the initiation of welding in a second time period 205. The second laser signal 202 has caused the melt pool 19 to extend through the first metal part 151 and into the second metal part 152. The distal end 226 of the melt pool 19 is shown penetrating the second metal part 152. The melt pool 19 will then begin to contain metal from both the first metal part 151 and the second metal part 152. Alternatively or additionally, metal from the first metal part 151 may penetrate into the second metal part 152. In either case, welding can be said to have been initiated. A key hole 133 is shown as being present. The key hole 133 was described with reference to FIG. 13, and will be further described with reference to FIGS. 22 and 23. The key hole 133 may not occur during the second time period 205 and may not occur at all. If the key hole 133 is present, then most of the laser beam 62 may be absorbed by the key hole 133. When welding reflective metals, it may therefore be beneficial that at least one of the peak power 162 and the pulse energy 165 of the second laser signal 202 reduces with the increasing absorption of the laser beam 62 in order to limit eruptions occurring from the key hole 133. If the welding process continues without the controller 153 changing to the third laser signal 203, then there can be too much energy being absorbed by the first and the second metal parts 151, 152, which can result in violent eruptions of material from the key hole 133, and consequently, rough surfaces that are undesirable, especially for such as jewellery and medical devices for insertion into humans.

A third cross section 223 shows the first metal part 151 being welded to the second metal part 152 in a third time period 206 by the third laser signal 203. This may occur in the same pass of the laser beam 62 across the surface 6 in which the first and the second laser signals 201 and 202 were applied, or in a subsequent pass. If the first material 1 is highly reflective, then the peak power 162 of the third laser signal 203 may be selected such that it is less than the peak power 162 of the second laser signal 202; this has the effect of causing less violent eruptions of molten material from the key hole 133. In certain circumstances, it may be preferred that the third laser signal 203 is a continuous wave signal. The melt pool 19 is shown as being larger than the melt pools 19 in the first and second cross sections 221, 222, but this is meant to be non limiting. The laser beam 62 is shown focused into the key hole 133. The distal end 226 of the weld pool 19 is shown extending further into the second metal part 152. The key hole 133 may not be present during the third time period 206.

Key hole welding is shown in more detail in FIG. 22. In this process, the laser beam 62 not only melts the first and the second metal parts 151, 152, but also produces vapour. The dissipating vapour exerts pressure on the molten metal 225 and partially displaces it. The result is a deep, narrow, vapour filled hole called the keyhole 133. Such a process may be involved in the formation of the microweld 8 and the heat stakes 17 (if present) in the apparatus and method of the invention.

The method may be one in which the key hole 133 is surrounded by the molten metal 225, and moves with the laser beam 62 in the direction 226 that the laser beam 62 is scanned. The molten metal 225 solidifies behind the keyhole 133 as it moves, forming the microweld 8. The microweld 8 can be deep and narrow. The laser beam 62 is absorbed with high efficiency in the key hole 133 as it is reflected multiple times. As shown in FIG. 23, the microweld 8 may have a depth 228 that is greater than its width 229. The weld depth 228 can be up to ten times greater than the weld width 229. Alternatively, the weld depth 228 can be greater than ten times greater than the weld width 229.

The heat stake 17 shown with reference to FIGS. 15 and 21 can form at least part of the microweld 8 shown in FIG. 23. The width 229 can be the characteristic feature size 7 shown with reference to FIGS. 1 to 5 and FIG. 15. By heat stake 17, it is meant a weld that penetrates into the second metal part 152. The heat stake 17 may resemble a spike penetrating the second metal part 152. Alternatively, the heat stake 17 may be a deep penetration weld that may be linear or curved along its length. The first and second materials 1, 2 may be mixed together in the heat stake 17, or they may be substantially unmixed. Alternatively the heat stake 17 may mainly comprise the first material 1.

In certain cases, such as for example when welding materials having substantially different melting temperatures, the key hole 133 may not close properly, leaving a void 122 in the weld 3. This can be resolved by providing a fourth laser signal 240, shown with respect to FIG. 24, which laser signal 240 is selected to close the key hole 133. The average power 153 of the fourth laser signal 240 may be reduced with time. In FIG. 24, the fourth laser signal 240 comprises a plurality of pulses 161, with a smaller pulse repetition frequency 167 than the pulse repetition frequency 167 of the third laser signal 203. In addition, the peak power 162 is reduced with time. Other fourth laser signals 240 are also possible.

Referring again to FIG. 21, the microweld 8 is shown in cross section after it has cooled down. The microweld 8 is shown as comprising an optional heat stake 17 extending into the second metal part 152. Also shown is material 132 on the surface of the weld 3, and a void 122 within the second metal part 152. The material 132 and the void 122 were previously described with reference to FIG. 13. As described with reference to FIGS. 1 to 14, pattern 5 can comprise a plurality of the microwelds 8 shown in FIG. 21, or a single microweld 8 which forms the pattern 5.

The welding method can be improved or optimized with respect to one or more of the following criteria: (i) the elimination or reduction of the material 132, (ii) the elimination or reduction of the voids 122, (iii) reduction of surface roughness or the improvement of a surface of the weld 3, (iv) reduction of time taken to form the weld 3, (v) strength of the weld 3, and (vi) reliability of the weld 3. The optimization can be achieved through the selection of one or more of the first, second, third and fourth laser signals 201, 202, 203, and 240, the selection and focusing of the objective lens 68, and the selection of scanning speeds of the scanner 67. The optimization can be achieved through experimentation. For example, at least one of the first, second and third signals 201, 202, 203 may be selected to inhibit the formation of intermetallics. This should increase the strength and the reliability of the weld 3. Parameters for optimizing welds in different materials and thicknesses 143, 144 can be stored in the controller 153 and the laser 61.

The microweld 8 may be formed by a single pass of the laser beam 62 over the surface 6, or in multiple passes of the laser beam 62 over the surface 6. The first, second and third laser signals 201, 202, 203 may be provided in a single pass of the laser beam 62 as it forms the microweld 8. Alternatively, the first and the second laser signals 201, 202 can be provided in a pass of the laser beam 62 over the surface 6, and the third laser signal 203 in another pass of the laser beam 62 over the surface 6.

In certain cases, it is important that the method for forming the weld 3 is as simple as possible, and preferably uses the same steps for different materials. In this event at least two of the first, second, third, and fourth laser signals 201, 202, 203, and 240 can comprise pulses 161 having the same waveforms.

The method of the invention described with respect to FIGS. 15 and 21 can comprise the steps described with reference to FIGS. 7 to 14. The method can include forming the hole 71 in the first material 1 with the laser 61, melting at least one of the first and the second materials 1, 2 with the laser 61, and flowing at least one of the first and the second materials 1, 2. The first and the second materials 1, 2 may be flowed into the hole 71. The first material 1 and the second material 2 may remain substantially unmixed in the microweld 8 as shown in FIG. 8. The hole 71 may be formed by pulsing the laser 61 such that at least some of the first material 1 is injected into the second material 2 as shown in FIGS. 12 and 13.

The step of forming the hole 71 may include cutting the first material 1. By cutting, it is meant cutting or engraving. The step may include cutting the second material 2.

The steps of melting and flowing at least one of the first and the second materials 1, 2 may be provided in an additional pass of the laser beam 62 over the microweld 8.

The step of forming the hole 71 may include forming a microweld 8 between the first material 1 and the second material 2. However, the microweld 8 may not have the required strength, structure or appearance. The steps of melting at least one of the first and the second materials 1, 2, and flowing at least one of the first and the second materials 1, 2 may improve the strength, structure or appearance of the microweld 8. Preferably some or all of the laser parameters described with reference to FIG. 16 are selected to inhibit the formation of intermetallics 281 in the microweld 8 when melting and flowing at least one of the first and the second materials 1, 2.

The step of melting at least one of the first and the second materials 1, 2 may include the step of operating the laser 61 such that the pulse fluence 176 preferentially melts one of the first and the second materials 1, 2 in preference to the other one of the first and the second materials 1, 2. Preferentially melting one of the first and the second materials 1, 2 can inhibit the formation of intermetallics 281.

The step of melting at least one of the first and the second materials 1, 2 may include the step of operating the laser 61 with a pulse fluence 176 and a pulse repetition frequency 167 that melts both the first and the second materials 1, 2. Preferably, the pulse fluence 176 and the pulse repetition frequency 167 are selected such that at least one of the first and the second materials 1, 2 solidifies between successive pulses 161. This can inhibit the formation of intermetallics in the microweld 8.

The first material 1 may melt when exposed to a pulse energy 165 of 10 mJ or less. The pulse energy 165 may be 4 mJ or less. The pulse energy 165 may be 1 mJ or less. The pulse energy 165 may be 100 µJ or less. The pulse energy 165 may be 10 µJ or less. Thicker materials require larger pulse energies 165 than thinner materials.

As shown in FIGS. 10 to 12, the hole 71 may be formed by first forming the hole 76 that does not penetrate through the first material 1, and then pulsing the laser 61 such that at least some of the first material 1 is injected into the second material 2.

The step of forming the hole 71 may include pulsing the laser 61 with at least one pulse 100 having a pulse width 166 defined by a full width half maximum value that is less than or equal to 100 ns. The pulse width 166 may be less than or equal to 10 ns. The laser 61 may be a nanosecond pulsed laser.

The step of forming the hole 71 or the hole 76 may include pulsing the laser 61 with at least one pulse 161 having a pulse width 166 that is less than or equal to 20 ns. The pulse width 166 may be less than or equal to 1 ns. The pulse width 166 may be less than or equal to 100 ps. The pulse width 166 may be less than or equal to 10 ps. The laser 61 may be a picosecond pulsed laser. Preferably the laser 61 is such that it can emit both picosecond pulses (less than 1 ns) and nanosecond pulses (less than 1 μs). An advantage of having pulse widths 107 less than 1 ns is that less energy is provided in the pulse 161, and this can assist cutting the hole 76 in the first material 3 without surface roughness or penetration through the first material 1. Multiple pulses 161 may be employed to cut the hole 71 or the hole 76.

The laser weld 3 formed by the apparatus or the method of the invention may be autogenous, that is, no additional (filler) materials are added in forming the weld 3.

Referring to FIGS. 6, 15 and 21, the laser 61 can be a fibre laser, a solid state rod laser, a solid state disk laser, or a gas laser such as a carbon dioxide laser, or a combination thereof. The laser 61 may be a laser source with external optical modulators such as an acousto-optic modulator for creating the pulses 161. The laser 61 may be a Q-switched laser, a modulated continuous wave laser, or a quasi continuous wave laser. The laser 61 is preferably a master oscillator power amplifier. The laser 61 is preferably able to output laser pulses 161 as well as a continuous wave output.

The laser 61 may be defined by a beam quality $M^2$ value 109 that is between 1 and 25. The $M^2$ value 109 may be in a range 1 to 10, 1 to 5, or 2 to 5. Preferably the $M^2$ value 109 may be in a range 1.3 to 2. The $M^2$ value 109 may be less than 1.3.

The laser 61 is preferably a rare-earth-doped nanosecond pulsed fibre laser, such as a ytterbium doped fibre laser, an erbium-doped fibre laser, a holmium-doped fibre laser, or a thulium doped fibre laser. These lasers typically emit laser radiation at the wavelength 140 in the 1 μm, 1.5 μm, 2 μm and 2 μm wavelength windows respectively.

The laser 61 may be a laser that can emit the laser pulses 161 that have the pulse widths 166 between approximately 10 ps and 3000 ns, preferably in the range 100 ps and 1000 ns, and more preferably in the range 1 ns to 1000 ns. The laser 61 may also be able to emit a continuous wave laser signal. Preferably, the laser 61 has a wide variety of pulse shapes and pulse parameters that can be selected in order to optimize the properties and cost of producing the weld 3. An example of such a laser is the nanosecond ytterbium-doped fibre laser, model SPI G4 70 EP-Z manufactured by SPI Lasers UK Ltd of Southampton, England. The laser emits at a wavelength 140 in the range 1059 nm and 1065 nm. Table 1 shows pulse parameter data for 36 waveforms (wfm0 to wfm35) that are selectable by the operator of the laser. Each waveform has a minimum pulse repetition frequency PRF0 at which maximum pulse peak power is obtained, and a maximum pulse repetition frequency PRFmax at which the minimum pulse peak power is obtained. The maximum pulse energy Emax is obtained at the minimum pulse repetition frequency PRF0, and is not increased if the laser is operated below the minimum pulse repetition frequency. The peak power obtainable at the minimum pulse repetition frequency PRF0 is the peak power that corresponds to Emax, and is shown in the right hand column.

Figure 35:
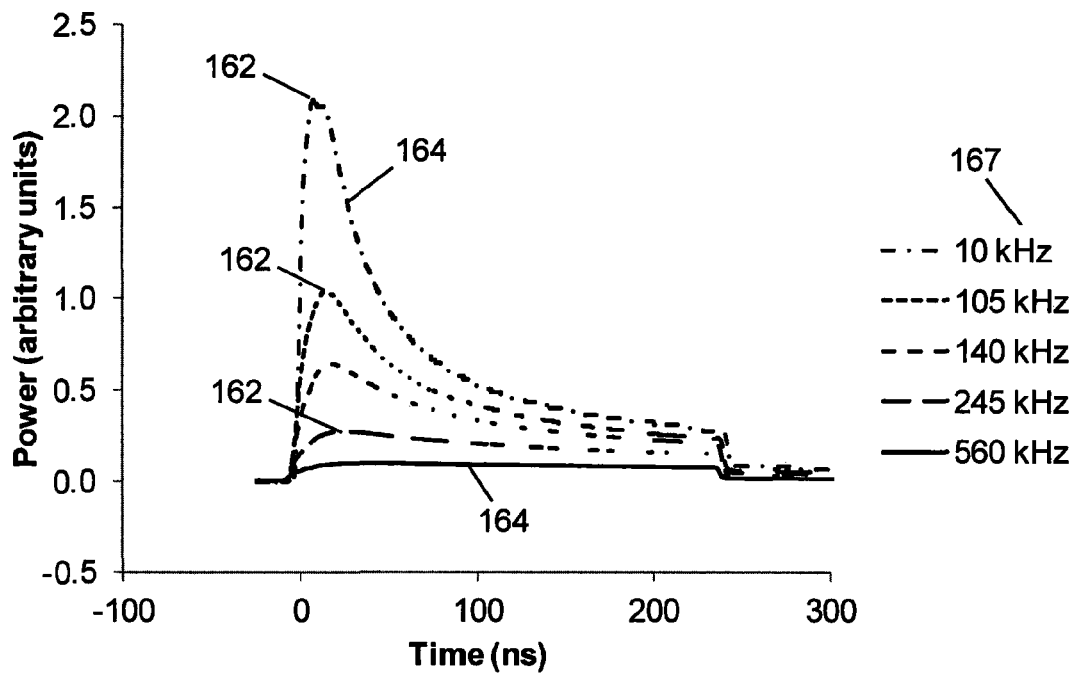
FIG. 35 shows evolution of pulse shape with pulse repetition frequency in a nanosecond pulsed fibre laser based on a master oscillator power amplifier configuration.

FIG. 35 shows how the pulse shape 164 varies with pulse repetition frequency 167 for waveform WF0 shown in Table 1. As the pulse repetition frequency 167 increases, the peak power 162 reduces, and the full width half power (FWHP) pulse width 166 increases from approximately 20 ns at 10 kHz to approximately 220 ns at 560 kHz. The average power 163 is approximately 70 W for each pulse waveform, the pulse energy 165 reducing with increasing pulse repetition frequency 167.

TABLE 1

Pulse parameters of the laser used in Examples 1, 2, and 11 to 13.

| wfm | PRF0 (kHz) | PRFmax (kHz) | Max. pulse energy, Emax (mJ) | Typ. FWHM pulse width at Emax (ns) | Pulse width at 10% (ns) | Typ. peak power at Emax (kW) |
|---|---|---|---|---|---|---|
| 0 | 70 | 1000 | 1.0 | 46 | 240 | 13 |
| 1 | 88 | 1000 | 0.87 | 45 | 220 | 10 |
| 2 | 95 | 1000 | 0.76 | 42 | 200 | 10 |
| 3 | 102 | 1000 | 0.71 | 40 | 175 | 10 |
| 4 | 105 | 1000 | 0.69 | 38 | 160 | 11 |
| 5 | 112 | 1000 | 0.64 | 40 | 145 | 10 |
| 6 | 119 | 1000 | 0.61 | 35 | 130 | 11 |
| 7 | 126 | 1000 | 0.57 | 33 | 120 | 11 |
| 8 | 130 | 1000 | 0.56 | 32 | 115 | 11 |
| 9 | 137 | 1000 | 0.53 | 35 | 105 | 10 |
| 10 | 144 | 1000 | 0.50 | 30 | 100 | 10 |
| 11 | 151 | 1000 | 0.48 | 36 | 90 | 10 |
| 12 | 158 | 1000 | 0.46 | 37 | 80 | 11 |
| 13 | 168 | 1000 | 0.43 | 26 | 65 | 10 |
| 14 | 179 | 1000 | 0.40 | 33 | 58 | 10 |
| 15 | 189 | 1000 | 0.38 | 27 | 60 | 10 |
| 16 | 200 | 1000 | 0.36 | 34 | 55 | 10 |
| 17 | 214 | 1000 | 0.34 | 34 | 50 | 10 |
| 18 | 228 | 1000 | 0.32 | 33 | 45 | 10 |
| 19 | 245 | 1000 | 0.29 | 32 | 40 | 10 |
| 20 | 266 | 1000 | 0.27 | 26 | 36 | 10 |
| 21 | 291 | 1000 | 0.25 | 26 | 33 | 10 |
| 22 | 315 | 1000 | 0.23 | 25 | 30 | 10 |
| 23 | 350 | 1000 | 0.21 | 23 | 26 | 10 |
| 24 | 403 | 1000 | 0.18 | 19 | 23 | 9 |
| 25 | 490 | 1000 | 0.15 | 16 | 20 | 9 |
| 26 | 600 | 1000 | 0.12 | 13 | 16 | 9 |
| 27 | 850 | 1000 | 0.08 | 9 | 10 | 8 |
| 28 | 1000 | 1000 | 0.07 | 9 | 10 | 7 |
| 29 | 70 | 900 | 1.0 | 72 | 270 | 8 |
| 30 | 70 | 800 | 1.0 | 75 | 295 | 8 |
| 31 | 70 | 600 | 1.0 | 85 | 320 | 7 |
| 32 | 70 | 600 | 1.0 | 90 | 350 | 7 |
| 33 | 70 | 600 | 1.0 | 95 | 380 | 6 |
| 34 | 70 | 600 | 1.0 | 100 | 420 | 6 |
| 35 | 70 | 500 | 1.0 | 110 | 470 | 6 |
| 36 | 70 | 500 | 1.0 | 115 | 520 | 5 |

Figure 36:
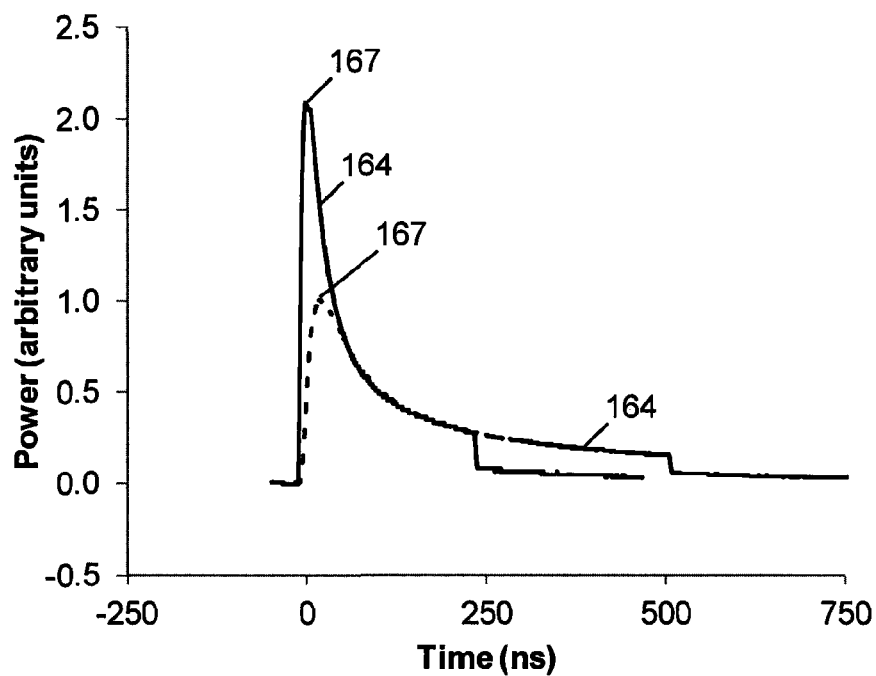
FIG. 36 shows two pulse waveforms having the same average power in the nanosecond pulsed fibre laser.

FIG. 36 shows the pulse shape 164 for two different pulse waveforms shown in Table 1 at the minimum pulse repetition frequency PRF0. The average power 163 is approximately 70 W for each pulse waveform.

The laser can also provide a continuous wave (cw) laser beam 62, which can be selected as the third or fourth laser signal 203, 240.

The ability to weld highly reflective metals using nanosecond fibre lasers, emitting in the 1 μm wavelength window, and with pulse energies 165 of around 1 mJ, is new and unexpected.

Referring to FIG. 21, the second laser signal 202 may be selected to have a plurality of the pulses 161. The pulse width 166 may be greater than 100 ps.

The second laser signal 202 can be selected to have a peak power 162 that is substantially greater than the peak power 26 of the third laser signal 203.

The second laser signal 202 can be selected to have a pulse repetition frequency 167 which is substantially less than the pulse repetition frequency 167 of the third laser signal 203. The average power 163 of the second laser signal 202 may be characterized by an average power which is substantially equal to the average power 163 of the third laser signal 203. The third laser signal 203 may be a continuous wave signal; this can be advantageous when welding a reflective metal as it avoids rapid absorption of pulse energy 165 that increases vapour pressure in the first material 1 and results in eruptions of material from the microweld 8. The second and the third laser signals 202, 203 can be applied in the same pass of the laser beam 62 over the first material 1, or in different passes.

The peak power 162 of the first laser signal 201 may be selected to have a peak power 162 that is greater than a peak power 162 of the second laser signal 202. This can assist coupling of the laser beam 52 to the first material 62 as high peak power 162 is needed to overcome the reflectivity 145 of the first material 1.

The pulse energy 165 of the first laser signal 201 may be selected to a have a pulse energy 165 that is less than the pulse energy 165 of the second laser signal 202.

The pulse width 166 of the second laser signal 202 may be selected to be less than 2.5 ms, preferably less than 1 ms, and more preferably less than 100 ns.

The pulse repetition frequency 167 of the second laser signal 202 may be selected to be greater than 1 kHz, preferably greater than 10 kHz, and more preferably greater than 100 kHz.

The welding process that is optimised may be one that improves a smoothness of a surface 231 of the laser weld 3. Alternatively or additionally, the welding process that is optimised may be one that increases the strength of the laser weld 3. Alternatively or additionally, the welding process that is optimised may be one that reduces the time taken to form the laser weld 3.

As shown in FIG. 25, the first material 1 may be coated with a coating 251. The coating 251 may be a metal plating such as nickel or chrome, or may be a chemically-induced coating such as anodization. The coating 251 may be a polymer coating.

The first metal part 151 may comprise multiple layers 231 as shown with reference to FIG. 26. The multiple layers 231 may be folded sheets of the same metal, layers of the same metal, or layers of different metals. Alternatively or additionally, the second metal part 152 may comprise multiple layers 232. The multiple layers 232 may be folded sheets of the same metal, layers of the same metal, or layers of different metals. The layers 231 may comprise the same metal as the layers 232, or different metals. The weld 3 is shown joining the first metal part 151 to the second metal part 152. The weld 3 is shown partially penetrating the second metal part 152.

FIG. 27 shows a laser weld 275 comprising a weld pool 270 between the first metal part 151 and the second metal part 152 using prior art techniques, including for example, laser welding with a green laser using a single high-energy pulse of 100 mJ or more, or welding with a quasi continuous wave fibre laser. The weld 275 has a similar overall size as the weld 3 shown in FIG. 1. Consequently, the weld pool 270 is considerably larger than the microwelds 8 when molten shown with reference to FIGS. 1 to 5 and 7 to 14, has a higher thermal mass, and will take a longer time to cool down. This results in metallic mixing. However if the mixing is not good enough, then this results in the formation of an associated boundary layer 271, which when welding dissimilar metals, contains intermetallics that can be brittle. There is also an area around the weld pool 270 that is affected by the heat but where the metals have not flowed—the so-called heat affected zone (HAZ) 272. The mechanical properties of the heat affected zone 272 can be substantially degraded as a result of thermal heat tempering, and should generally be minimized. The heat affected zone 272 is generally visible (eg after etching with acid) on both the top surface 273 of the first metal part 151 and the bottom surface 274 of the second metal part 152.

The boundary layer 271, when welding steel to steel, can result in carbon formation along grain boundary interfaces, thereby providing a pathway for fracturing the weld 3. Similarly, the boundary layer 271 when welding dissimilar metals may comprise intermetallics with a grain structure reflecting the cooling time from fusion to solidification. Such intermetallics are often brittle in nature, and therefore represent a weak point in the weld pool 270. Thus the existence of the boundary layer 271 and heat affected zone 272 are not desirable in either the welding of similar metals or the welding of dissimilar metals.

Whether the weld 275 is formed from similar metals or dissimilar metals, the mechanical properties of the material comprising the weld 275 are likely to be weaker than the properties of the base materials that comprise the first metal part 151 and the second metal part 152. Heat affected zones 272 are also of a concern if they affect the appearance or chemical composition of the first and second metal parts 151, 152.

The problems associated with intermetallic layers 271 and heat affected zones 272 increase when welding thin sheet metals (less than 1 mm). Other issues concerning the time taken for welds to cool down include damage to coatings such as polymers on the first and second metal parts 151, 152.

FIG. 28 depicts a top view of the weld 3 shown in FIG. 1. Here the weld 3 is circular, achieved by rastering the laser beam 62 around on the metal surface 6. A heat affected zone 281 is usually visible (possibly after chemical etching). However, with proper selection of the laser 61 and the laser pulse parameters shown with reference to FIGS. 16 and 17, there is generally no heat affected zone visible on the bottom surface. This is because the microweld 8 has significantly less mass than the weld pool 270, and consequently cools more rapidly. Similarly, there is little or no evidence of intermetallic layers 271 surrounding the microwelds 8. These features provide great advantages over prior art welding techniques.

Referring to FIGS. 16 and 17, the method of the invention can be one in which the pulse repetition frequency 167 is greater than 10 kHz, and the spot size 174, the pulse fluence 176, the pulse width 166, and the pulse repetition frequency 167 are selected such that at least one of the first material 1 and the second material 2 resolidifies between successive laser pulses 161 thereby inhibiting the formation of an intermetallic phase in the weld 3. The pulse repetition frequency 167 may be greater than 100 kHz and may be greater than 200 kHz. The pulse repetition frequency 167 may be greater than 500 kHz.

The spot size 174 may be less than 100 μm. The spot size 174 may be less than 60 μm. The first or the second material 1, 2 may have a higher melting temperature than the other material. The first material 1 may have a reflectivity 145 greater than 90% at an optical wavelength 140 of one micron.

The second metal part 152 shown in FIG. 29 may comprise a metal part 292 which is coated with a coating 293. The coating 293 may be a metal plating such as nickel or chrome, or may be a chemically-induced coating such as an anodization. The first metal part 151 may be a tab 291 such as found in beverage cans. The tab 291 is shown welded to the second metal part 152 with the weld 3.

Beverage cans are often made from thin sheets of aluminium (the second metal part 152) that are less than 250 μm in thickness. In a beverage can, the coating 293 would be a polymer coating usually applied before the weld 3 is formed. It is important that the method of forming the weld 3 does not degrade the coating 293. The apparatus and method of the present invention achieves this by virtue of the microweld 8, shown with reference to FIGS. 1 to 24, as there is less heat generated in the second metal part 152 compared to a prior art weld.

FIG. 30 shows a graph of pulse fluence 176 and absorbed energy density 303, where the absorbed energy density 303 is the total pulse energy 165 absorbed by the first and the second metal parts 151, 152 per unit surface area by the laser pulses 161. In order to initiate the weld 3 shown with reference to FIGS. 1 to 5, 7 to 15, 18 to 24, and 25, it is necessary to use a pulse fluence 176 that is at least equal to the first pulse fluence threshold 301. This is in order to initiate the melting of the metal surface 6. Once the metal surface 6 has begun to melt, the remaining pulses 161 should have a pulse fluence 176 that is at least equal to the second pulse fluence threshold 302. The second pulse fluence threshold 302 can be substantially less than the first pulse fluence threshold 301. As each of the pulses 161 is absorbed, they contribute to the absorbed energy density 303. The absorbed energy density 303 absorbed at each of the focused locations 16 should be at least equal to the first energy density threshold 304 at which the microweld 8 begins to penetrate the second metal part 152, but less than the second energy density threshold 305 at which the weld 3 becomes unacceptably brittle. If too much energy is absorbed by the weld 3, there will be excessive heating of the first and the second materials 1, 2, resulting in sufficient time for intermetallics to form and a weak weld 3. It can be seen that by varying the pulse parameters shown with reference to FIGS. 16 and 17, the number of pulses 161, and the distances 181 between focused spots 12, there is a great controllability of the weld 3, and moreover, greater control over its formation, and therefore mechanical properties, than prior art techniques. The preferred values will vary for different materials, and thicknesses of materials, and can be found by experimentation.

The method described with reference to FIGS. 15 and 21 may include the step of remelting at least one of the first and the second materials 1, 2 with the laser 61. This can improve the cosmetic appearance of the weld 3, and also improve physical characteristics such as shear strength, peel strength, porosity, and ohmic resistance.

In Examples 1 and 2, provided below, the laser 61 was a nanosecond ytterbium-doped fibre laser, model SPI G4 70 EP-Z manufactured by SPI Lasers UK Ltd of Southampton, England. The laser 61 is the master oscillator power amplifier described with reference to FIGS. 35 and 36. The beam quality 146 had an $M^2$ value of approximately 1.6. The scanner 67 was a galvanometer-scanner model Super Scan II manufactured by Raylase of Munich, Germany with a 10 mm beam aperture (not shown). It can be controlled with a controller (not shown) such as a desktop computer with a Windows 8 operating system on which SCAPS scanner application software licensed by SCAPS GmbH of Munich, Germany. This can be used to program, operate, and store code for steering the laser beam 62. The lens 68 was a 163 mm focal length F-theta lens.

The above equipment can be used to form and translate the laser beam 62 onto the top surface 6 of the first material 1 with a focused spot having a spot size 174 ($1/e^2$ diameter) of 40 μm and an area 175 of $1.256 \times 10^{-5}$ cm².

Example 1

Figure 31:
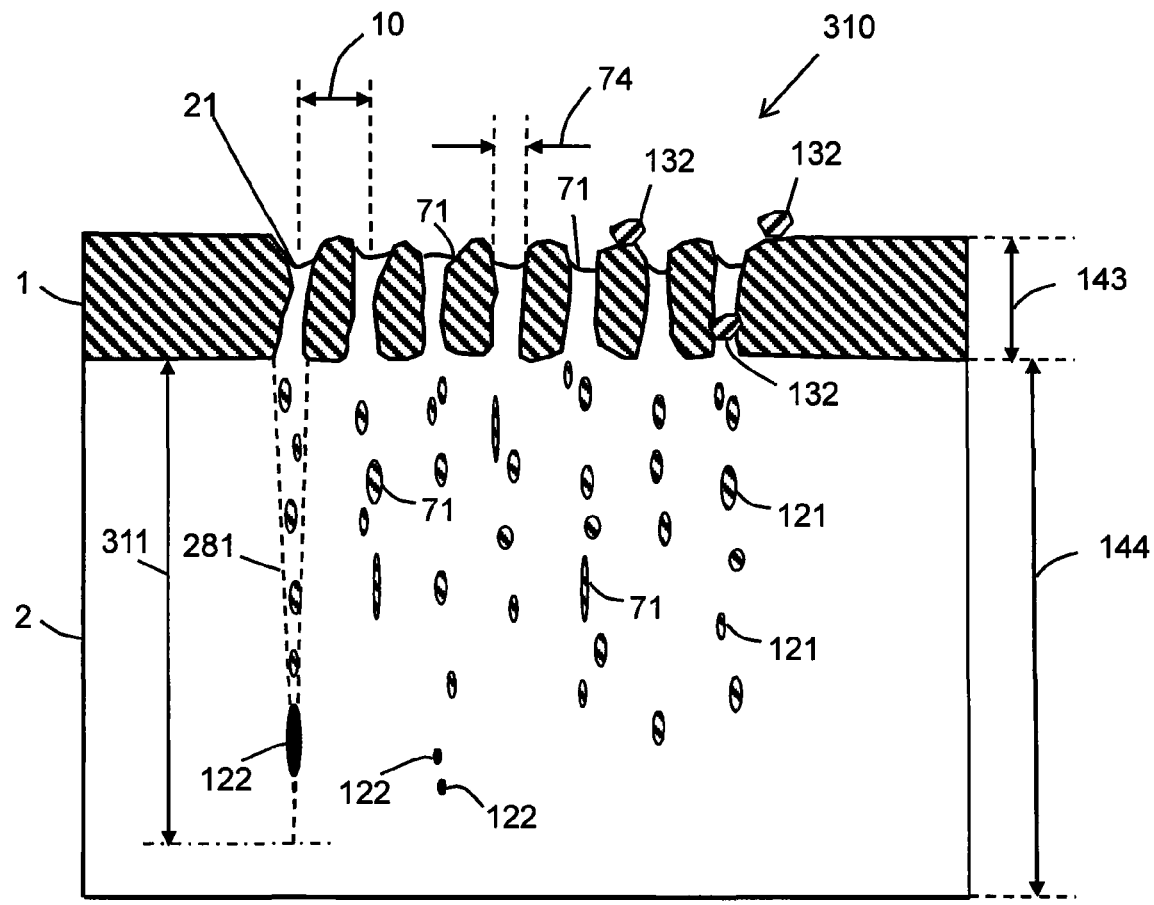
FIG. 31 shows an example of a weld made according to a method of the present invention.

FIG. 31 shows an artistic impression of a cross-section through a weld 310 formed between copper having a thickness 143 of 100 μm and aluminium having a thickness 144 of 400 μm. The weld 310 was in the shape of the spiral, shown with reference to FIG. 2, with a first separation 10 of 50 μm between the spiral arms 9, and a diameter 4 of 1 mm. The width 74 of the hole 71 was approximately 5 μm to 20 μm. The weld 310 was formed using multiple pulses 161 from the laser 61, which pulses 161 overlayed each other on the first material 1 by approximately 95% to 98% in area. The laser 61 has cut the first material 1, which is copper, and the second material 2 (aluminium) has flowed into the hole 71. At least some of the first material 1 has been injected into the second material 2, as evidenced by the zones 121 that comprise the first material 1. The zones 121 extend to approximately 300 μm to 400 μm into the second material 2. Voids 122 are also present. A heat affected zone 281, shown by the approximately triangularly-shaped dashed line of depth 311, is present under the holes 71. Only one of the heat affected zones 281 is shown for clarity. This heat affected zone 281 resembles a heat stake that is commonly seen when welding thermoplastic parts together.

Figure 32:
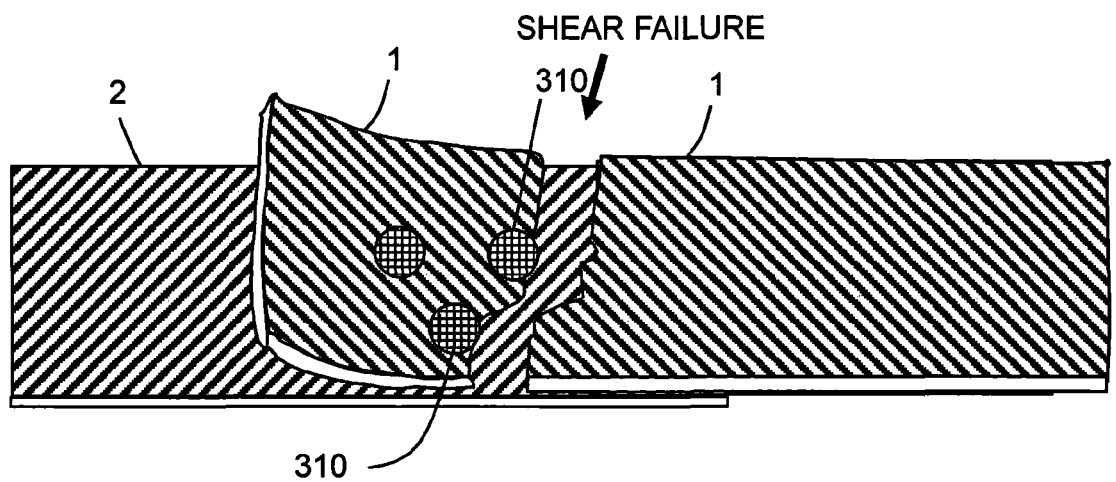
FIG. 32 shows the results of a shear test of the weld shown in FIG. 31.

The weld 310 has excellent shear resistance, as evidenced by a shear test. FIG. 32 illustrates the failure mode when three welds 310 of the type shown in FIG. 31 were sheared. The first material 1 failed around the welds 310, and not through the welds 310, thus indicating that the welds 310 were stronger than the surrounding material. This is an unexpected result, and shows the importance of being able to flow the second material 2 into the hole 71 without forming characteristically brittle intermetallics.

Figure 33:
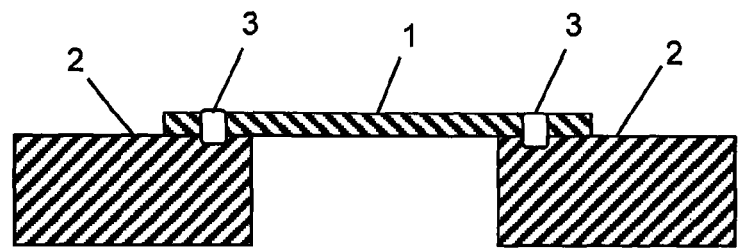
FIG. 33 shows two sheets of aluminium foil connected by copper foil using welds according to the present invention.

The weld 310 has surprisingly good shear resistance, and excellent ohmic resistance. This makes the welding process of the invention as described with reference to FIGS. 15, 21 and 31, suitable for joining sheets of first material 1 and second material 2 with welds 3, wherein the weld 3 provides electrical contact between the first material 1 and the second material 2. In the example of FIG. 33, the first material 1 is copper, and the second material 2 is aluminium, a combination of materials that is often found in batteries.

Additional peel strength would be obtainable by increasing the countersinking of the hole 71 as shown in FIG. 7.

Example 2

Figure 34:
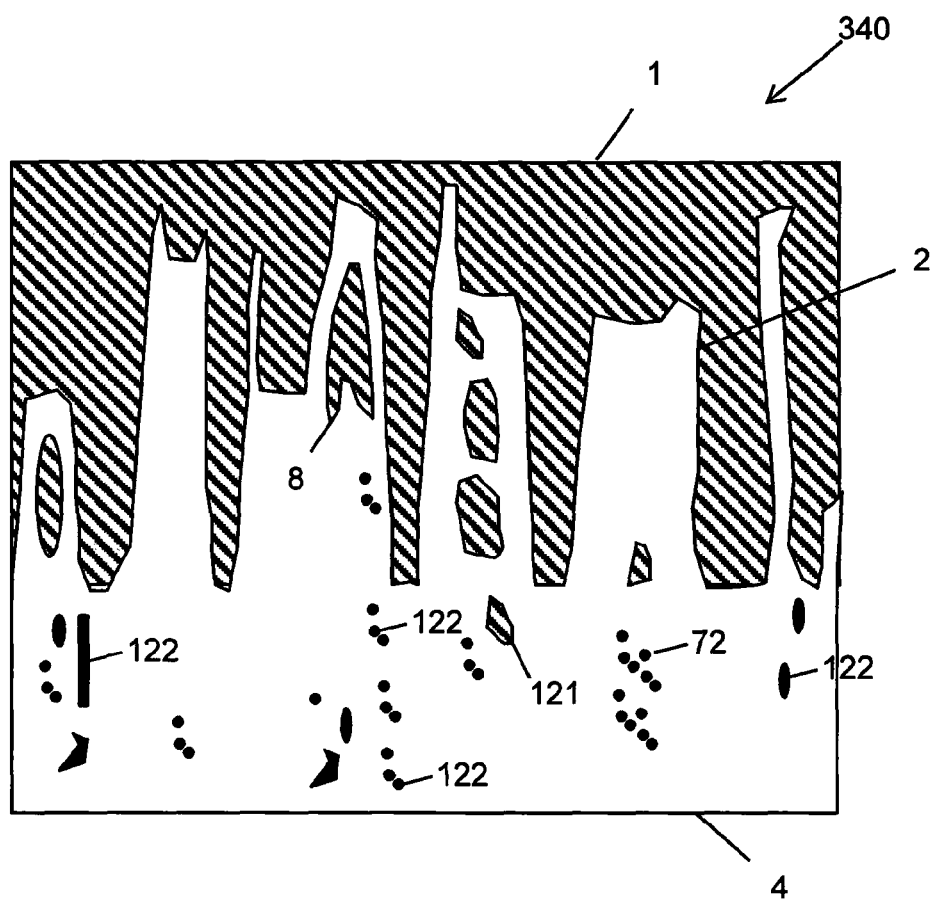
FIG. 34 shows a weld formed of brass and copper.

FIG. 34 shows an artistic impression of a cross section of a weld 340 between a first material 1 copper and a second material 2 brass. The weld 340 was also formed in a similar spiral to the weld 310 shown with reference to FIG. 13. It is surprising that the brass has flowed into the copper material to form the weld 340 with very little intermetallic mixing. The weld 340 is substantially inhomogeneous. The copper and the brass have flowed, but have not mixed together to form new homogeneous material phases. The material phases of the copper and the brass are largely unmixed, with the copper and the brass being in their original material phases. This is particularly surprising given that brass is an alloy of copper and zinc. There are zones 121 of the first material 1 contained within the second material 2. There are also voids 122. The resulting joint formed by the weld 340 has excellent shear strength.

Examples 3 to 10

The laser 61 used in Examples 3 to 10 was a nanosecond ytterbium-doped fibre laser, model SPI G4 70 W HS-H manufactured by SPI Lasers UK Ltd of Southampton, England. The laser is substantially similar to the laser used in Examples 1 and 2, though with a poorer beam quality 146, which was increased from approximately $M^2=1.6$ to approximately $M^2=3$. The spot size 174 was approximately 80 μm, which is approximately twice as large as obtained with the higher brightness laser used in Examples 1 and 2. Similar waveforms are provided with the laser as were described with reference to Table 1 and FIGS. 25 and 36.

Table 2 shows details of the welds 3 in Examples 3 to 10. The first metal listed in each example was the first material 1, and the second metal listed was the second material 2.

The welding pattern 5 was the rectangular hatching of FIG. 3. The first separation 10 and the third separation 32 were both equal to each other, and were varied between 0.2 mm and 2 mm. The optimum value was found to be approximately 0.5 mm in each of the Examples 3 to 10.

The characteristic feature size 7 of the microweld 8 was the width of the microwelds, which was approximately 60 μm to 250 μm depending on the materials used.

The width 4 of the welds 3 was between 1.5 mm and 5 mm, depending on the metals and their thickness. Larger widths were used on the thicker metals.

Argon was used as the shield gas 155 in Examples 5 to 10. There was no shield gas used in Examples 3 and 4. The nickel alloy was an austenite nickel-chromium iron alloy that is sold under the trade name INCONEL 718. The stainless steel was a molybdenum-bearing grade, austenitic stainless steel under the trade name SS316.

In Table 2, the first column shows the materials that were welded together. In each Example, the first metal stated were the first material 1, and the second metal stated was the second material 2. The thicknesses 143, 144 of the first and second materials 1, 2 are shown as the size in mm.

In each Example, there were two passes of the laser beam 61 in the same pattern 5 shown with reference to FIG. 3. The parameters of the first pass are shown in the first line of each Example, and the parameters of the second pass are shown in the second line of each Example. The parameters were varied to optimize the appearance and the strength of the welds 3, and the optimized parameters are shown in the table.

The first pass had a higher peak power 162 than the peak power 162 of the second pass. The first pass created holes 71 in the first material 1 as shown with reference to FIG. 8. The holes 71 may also extend into the second material 2. The first pass can also create a weld 3. However most of the welds 3 created by the first pass could easily be broken, were in general not strong, and had poor appearance. The second pass melted at least one of the first and the second materials 1, 2. If the second material 2 melted in preference to the first material 1, then the second material 2 flowed into the hole 71 as described with reference to FIG. 9. However if the first material 1 melted in preference to the second material 2, then the first material 1 flowed into the hole 71, which hole 71 may extend into the second material 2. The result in each of the Examples 3 to 10 was a weld 3 that was substantially stronger than achieved with the first pass. It is believed that this is because the formation of intermetallics was inhibited. In addition, the second pass cleaned the surface 6 giving the weld 3 a smooth and clean appearance.

In each of the Examples save for Example 9, the first pass had a peak power 162 of 13 kW at a pulse repetition frequency 167 of 266 kHz. For Example 9, the first material 1 was copper, and the first pass was performed with a slower scan speed and at a peak power 162 of 25 kW. A slower scan speed was also required in Examples 4 and 10 where the second material 2 was copper; copper has a high reflectivity 145. It was not necessary to decrease the scan speed in Example 7. Without wishing to limit the scope of the invention, it is believed that this may be because titanium has a higher melting point than copper.

The laser parameters used in the second pass were varied in order to optimize the strength and appearance of the welds 3. Surprisingly, good welds could be produced with continuous wave signals in each case. However, a higher frequency waveform produced stronger welds in Examples 3 to 9. In Examples 4 to 9, the pulse repetition frequency 167 was 600 kHz, resulting in pulses 161 having approximately 44% of the pulse energy 165 than in the first pass. In Example 3, as a result of the lower average power used, the pulse energy 165 in the second pass was 32% of the pulse energy 165 of the first pass. It is believed that the lower pulse energies resulted in less vapour pressure being generated when the laser beam 62 was absorbed during the second pass. The second pass for Example 10 was made using a continuous wave signal having a peak power 162 equal to the average power 163 of 50 W. The scan speed was 20 mm/s, which was lower than the scan speed of 30 mm/s of the first pass. It was necessary to use a relatively slow scan speed (20 to 25 mm/s as compared to 75 to 80 mm/s) for the second pass in Examples 4, 9 and 10, all of which involved welding copper. The scan speed for the second pass was 80 mm/s when welding titanium to copper, Example 7.

The welds 3 produced by Examples 3 to 10 have a very different appearance from prior art welds. By taking advantage of the variety of pulse waveforms obtainable from the laser, it was possible to obtain strong welds from materials, such as stainless steel to aluminium, that have hitherto been difficult to weld.

TABLE 2

Process Parameters used in Examples 3 to 10

| Example | Size (mm) | Scan speed (mm/s) | FWHM Pulse Width (ns) | 10% Pulse Width (ns) | Peak Power (kW) | PRF (kHz) | Average Power (W) |
|---|---|---|---|---|---|---|---|
| 3. Aluminium to Brass | 0.1 | 100 | 20 | 30 | 13 | 266 | 70 |
|  | 0.3 | 80 | 12 | 10 | 8 | 600 | 50 |
| 4. Aluminium to Copper | 0.1 | 30 | 20 | 30 | 13 | 266 | 70 |
|  | 0.4 | 25 | 12 | 10 | 8 | 600 | 70 |
| 5. Stainless Steel to Aluminium | 0.15 | 100 | 20 | 30 | 13 | 266 | 70 |
|  | 0.5 | 75 | 12 | 10 | 8 | 600 | 70 |
| 6. Titanium to Aluminium | 0.12 | 160 | 20 | 30 | 13 | 266 | 70 |
|  | 0.5 | 120 | 12 | 10 | 8 | 600 | 70 |
| 7. Titanium to Copper | 0.12 | 160 | 20 | 30 | 13 | 266 | 70 |
|  | 0.4 | 80 | 12 | 10 | 8 | 600 | 70 |
| 8. Aluminium to Nickel alloy | 0.1 | 120 | 20 | 30 | 13 | 266 | 70 |
|  | 0.5 | 40 | 12 | 10 | 8 | 600 | 70 |
| 9. Copper to Nickel alloy | 0.1 | 30 | 24 | 250 | 25 | 55 | 70 |
|  | 0.5 | 20 | 12 | 10 | 8 | 600 | 70 |

TABLE 2-continued

Process Parameters used in Examples 3 to 10

| Example | Size (mm) | Scan speed (mm/s) | FWHM Pulse Width (ns) | 10% Pulse Width (ns) | Peak Power (kW) | PRF (kHz) | Average Power (W) |
|---|---|---|---|---|---|---|---|
| 10. Stainless Steel to Copper | 0.15 0.4 | 30 20 | 20 CW | 30 CW | 13 50 W | 266 CW | 70 50 |

Example 11

Other than as stated below, the welds described in Examples 11 to 13 were made using the same apparatus as used for Examples 1 and 2. With reference to FIG. 15, the first material 1 was copper grade C110 with a 150 μm thickness, and the second material 2 was aluminium grade 5052 with a 500 μm thickness. Following experimentation to determine the peak power 162, the pulse shape 164, the pulse energy 165, the pulse width 166, and the pulse fluence 176, it was decided to scan the laser beam 62 at a linear speed of 50 mm/s over the metal surface 6 and with the distance 181 (shown with reference to FIG. 18) between successive of the focused spots 12 of 0.7 μm (measured centre to centre). This corresponds to the pulse repetition frequency 167 of 70 kHz. The appropriate control parameters were then fed into the controller 153 and the laser 61 set up accordingly, The laser beam 62 was repetitively pulsed at the pulse repetition frequency 167 of 70 kHz, and scanned over the metal surface 6 in the spiral 22 shown with reference to FIG. 10. The spiral 22 was formed with a 50 mm/s linear speed. The total length of the spiral 22 was 15.8 mm, and was formed from the inside 22 to the outside 24 of the spiral. The diameter 4 of the weld 3 was 1 mm. The pulse width 166 was 115 ns at full width half maximum FWHM. The pulse width 169 was 520 ns at 10% of peak power 162. Total pulse energy 165 was 1 mJ with an average power 163 of 70 W and a peak power 162 of 5 kW. Each laser pulse 161 had a peak power intensity of $3.98 \times 10^{+8}$ W/cm$^2$ with a pulse fluence 176 of 79.6 J/cm$^2$. A shield gas mixture 155 was used of 50% Argon and 50% Helium. The gas supply 156 was a 6 mm diameter copper nozzle that was placed over the weld 3. The gas was supplied through a flow control regulator at 10 cubic feet per hour. The weld 3 that was formed is of the type shown in FIGS. 2 and 15. The heat stakes 17 form a continuous line along the spiral 22, and are at least partially separated in a radial direction 25 across the spiral 22, corresponding to the direction 155 shown in FIG. 15. The weld pools 19 are continuous across the entire surface area of the weld 3, though as shown in FIG. 15, the surface of the weld 3 is not smooth. Observation of the welds 3 revealed aluminium colouring on the top surface 6, indicating that the aluminium has melted and has flowed. The copper and aluminium have at least partially mixed in the weld 3. The welds 3 were observed to be extremely strong for their size.

Example 12

With reference to FIG. 15, the first material 1 was copper grade C110 with a 150 μm thickness 143, and the second material 2 was also copper grade C110 with a 150 um thickness 144. After experimentation, it was determined that the same process parameters could be used as described with reference to Example 11. The resulting welds were observed to be extremely strong for their size.

Example 13

With reference to FIG. 15, the first material 1 was stainless steel grade 304 with a 250 μm thickness 143 and the second material 2 was grade stainless steel 304 with a 250 μm thickness 144. Following experimentation to determine the peak power 162, the pulse shape 164, the pulse energy 165, the pulse width 166, and the pulse fluence 176, it was decided to scan the laser beam 62 at a linear speed of 225 mm/s over the metal surface 6 and with the distance 181 (shown with reference to FIG. 18) between successive of the focused spots 12 of 0.225 μm (measured centre to centre). This corresponds to the pulse repetition frequency 167 of 1 MHz. The appropriate control parameters were then fed into the controller 153 and the laser 61 set up accordingly, The laser beam 62 was repetitively pulsed at the pulse repetition frequency 167 of 1 MHz, and scanned over the metal surface 6 in the spiral 22 shown with reference to FIG. 2. The spiral 22 was formed with a 225 mm/s linear speed. The spiral 22 was formed from the inside 22 to the outside 24. The diameter 4 of the weld 3 was 1 mm. The pulse width 166 was 9 ns at full width half maximum FWHM. The pulse width 168 was 9 ns at 10% of the peak power 162. Total pulse energy 165 was 7 μJ with an average power 163 of 70 W and a peak power 162 of 8 kW. Each laser pulse 161 had a peak power intensity 179 of $6.36 \times 10^{+8}$ W/cm$^2$ with a pulse fluence 176 of 5.6 J/cm$^2$. A shield gas mixture 155 was used of 50% Argon and 50% Helium supplied thorough a low control regulator at 10 cubic feet per hour from a 6 mm diameter copper nozzle over the weld 3. The weld 3 that was formed is of the type shown in FIGS. 2 and 15. The heat stakes 17 extended from the weld 3 in the form a continuous line along the spiral 22, and are at least partially separated in a radial direction 25 across the spiral, corresponding to the direction 155 shown in FIG. 15. The weld pools 19 are continuous across the entire surface 6 of the weld 3, though as shown in FIG. 15, the surface of the weld 3 is not smooth. The top surface of the weld 3 resembled a traditional lap weld, with excellent mixing of the metals, but almost negligible heat affected zone 272 (shown with reference to FIG. 27). However the extension of the heat stakes 17 from the weld 3 was substantially less than observed for the copper aluminium and copper welds of Examples 11 and 12 respectively. The welds 3 were observed to be extremely strong for their size.

The present invention also provides a weld 3 according to the method of the invention.

The present invention also provides an article when welded according to the method of the invention. Examples of articles are a smart phone, a mobile phone, a laptop computer, a tablet computer, a television, a consumer electronic device; a battery; a solar cell; an integrated electronic circuit component; a printed circuit board; an electrical connection; a low profile electrical connection between flexible circuit elements and thin-section busbars; a metallic enclosure for a medical electronic device; and an electrical connection in consumer electronics devices; metallic labels and tags; silver, platinum, and gold parts in jewellery.

It is to be appreciated that the embodiments of the invention given above with reference to the Figures and the Examples have been given by way of example only and that modifications may be effected. Individual components shown in the Figures and individual values shown in the Examples may be used in other Figures and other Examples and in all aspects of the invention.

The invention claimed is:

1. A method for laser microwelding a first material to a second material, which method comprises:
    placing a first metal part comprising the first material on a second metal part comprising the second material;"
    providing a laser for emitting a laser beam in the form of laser pulses;
    providing a scanner for scanning the laser beam with respect to a surface of the first metal part;
    providing an objective lens for focusing the laser pulses onto the surface; and
    providing a controller that is adapted to control the scanner such that the scanner moves the laser beam with respect to the surface,
    characterized by
    moving the laser beam with respect to the surface;
    focusing the laser pulses with a spot size and a pulse fluence that cause the formation of a weld comprising at least one microweld in the form of a welding pattern defined parallel to the surface; and
    operating the controller to form the microweld by selecting a first laser signal comprising a plurality of the laser pulses during a first time period to create a melt pool on the surface, then selecting a second laser signal comprising a plurality of the laser pulses during a second time period to initiate welding of the first metal part to the second metal part, and then selecting a third laser signal comprising either the laser pulses or a continuous wave laser beam during a third time period to weld the first metal part to the second metal-part;
    wherein the method is one that forms a key hole, the method further includes providing a fourth laser signal which is selected to close the key hole;
    wherein the microweld has a characteristic feature size of between 20 μm and 400 μm;
    the laser pulses have pulse widths between 1 ns and 3000 ns; "the first material is a first metal;" the second material is a second metal which is different from the first metal;
    the weld is autogenous; and
    wherein the laser pulses have a pulse energy of 10 mJ or less, the laser pulses have a pulse repetition frequency greater than 10 kHz, and the spot size is less than 100 μm.

2. The method according to claim 1 wherein the moving of the laser beam with respect to the surface of the first metal part is such that the weld has a width between 0.5 mm and 7 mm.

3. The method according to claim 1 wherein the laser is operated to form a plurality of melt pools in the first metal part and a plurality of heat stakes in the second metal part, wherein each heat stake extends from a different one of the melt pools and has a distal end, and the method including adapting the controller to space the focused spots apart by a distance that is small enough to cause the melt pools to overlap and that is large enough to ensure the distal end of the heat stakes are distinct and separate from each other in at least one direction.

4. The method according to claim 1 wherein the second laser signal is selected to have a peak power which is greater than a peak power of the third laser signal.

5. The method according to claim 1 wherein at least one of the first, second and third laser signals is selected to inhibit the formation of intermetallics.

6. The method according to claim 1 wherein at least one of the first, second and the third laser signals is selected to improve the smoothness of a surface of the weld.

7. The method according to claim 1 wherein the laser beam is characterized by a beam quality $M^2$ less than 4.

8. The method according to claim 7 wherein the laser is characterized by a beam quality $M^2$ less than 2.

9. The method according to claim 8 wherein the laser is characterized by a beam quality $M^2$ less than 1.3.

10. The method according to claim 1 wherein the laser is a nanosecond laser.

11. The method according to claim 1 wherein the laser is characterized by a wavelength between 1000 nm and 3000 nm.

12. The method according to claim 1, which method comprises: forming a hole in the first material with the laser; melting at least one of the first and the second materials with the laser; and flowing at least one of the first and the second materials into the hole.

13. The method according to claim 12 wherein the first material and the second material remain substantially unmixed in the weld.

14. The method according to claim 12 wherein the hole is formed by pulsing the laser such that at least some of the first material is injected into the second material to form a zone comprising the first material surrounded by the second material.

15. The method according to claim 12 wherein the hole is formed by first forming a hole that does not penetrate through the first material, and then pulsing the laser such that at least some of the first material is injected into the second material to form a zone comprising the first material surrounded by the second material.

16. The method according to claim 12 wherein the first material has a bottom surface that is closer to the second material than the surface of the first metal part, the hole has a width at the surface of the first metal part and a width at the bottom surface, wherein the width at the surface of the first metal part is wider than the width at the bottom surface, and the method includes the step of flowing the second material into the hole.

17. The method according to claim 1 and including a step of remelting at least one of the first material and the second material with the laser.

18. The method according to claim 1, wherein the weld comprises at least one void in at least one of the first material and the second material.

19. The method according to claim 1 wherein the laser pulses have the pulse repetition frequency, the pulse repetition frequency is greater than 10 kHz, and the spot size, the pulse fluence, the pulse widths, and the pulse repetition frequency are selected such that at least one of the first material and the second material resolidifies between successive laser pulses thereby inhibiting the formation of an intermetallic phase in the weld.

20. The method according to claim 1 wherein the spot size is less than 60 μm.

21. The method according to claim 1 wherein the laser pulses have a pulse energy of 4 mJ or less, 1 mJ or less, or 100 μJ or less.

22. The method according to claim 1 wherein the laser pulses have a pulse energy of 1 mJ.

23. The method according to claim 1 wherein the laser is a fibre laser.

24. The method according to claim 1 wherein the laser is a fibre laser, the laser beam is characterized by a beam quality $M^2$ less than 4, and the laser pulses have a pulse energy of 4 mJ or less, 1 mJ or less, or 100 µJ or less.

* * * * *